(12) United States Patent
Yoshida et al.

(10) Patent No.: US 6,501,524 B1
(45) Date of Patent: Dec. 31, 2002

(54) LIQUID CRYSTAL DISPLAY DEVICE

(75) Inventors: Hidefumi Yoshida; Yasutoshi Tasaka; Takatoshi Mayama; Seiji Tanuma; Takeshi Gotoh; Tetsuya Kobayashi; Yohei Nakanishi; Makoto Ohashi; Yoshio Koike; Arihiro Takeda, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/375,861

(22) Filed: Aug. 17, 1999

(30) Foreign Application Priority Data

Dec. 28, 1998 (JP) ............................................. 10-374809

(51) Int. Cl.$^7$ ............................................. G02F 1/1333
(52) U.S. Cl. ........................................ 349/130; 349/43
(58) Field of Search .......................... 349/42, 82, 130, 349/134, 139, 144, 153, 155, 156

(56) References Cited

U.S. PATENT DOCUMENTS

| | | | |
|---|---|---|---|
| 4,231,640 A | * 11/1980 | Funada et al. | 350/336 |
| 5,124,825 A | * 6/1992 | Asano et al. | 359/77 |
| 5,581,381 A | * 12/1996 | Shinjo et al. | 349/85 |
| 5,796,456 A | * 8/1998 | Takatori et al. | 349/117 |
| 5,852,485 A | * 12/1998 | Shimada et al. | 349/141 |
| 5,995,188 A | * 11/1999 | Shimizu et al. | 349/147 |

FOREIGN PATENT DOCUMENTS

EP 02000056296 A * 2/2000

OTHER PUBLICATIONS

Murai et al.; "Homeotropic reverse–mode polymer–liquid crystal device"; Journal of Applied Physics, vol. 81(4), pp. 1962–1965, Feb. 15, 1997.*

* cited by examiner

Primary Examiner—William L. Sikes
Assistant Examiner—Hoan Nguyen
(74) Attorney, Agent, or Firm—Greer, Burns, & Crain, Ltd.

(57) ABSTRACT

A homeotropic alignment type liquid crystal display device is provided with first and second substrates confronting each other, first and second bus lines arranged in mutually perpendicular directions on the second substrate, liquid crystals provided between the first and second substrates, and first, second and third projecting structures restricting alignment of the liquid crystals. The first projecting structures have a sloping surface which is inclined with respect to the first substrate and are provided on the first substrate in parallel with the first bus lines. The second projecting structures have a sloping surface which is inclined with respect to the second substrate and are provided on the second substrate in parallel with the first bus lines. Third projecting structures have a sloping surface which is inclined with respect to at least one of the first and second substrate and are provided on at least one of the first and second substrates with an arrangement different from the first and second projecting structures.

26 Claims, 37 Drawing Sheets

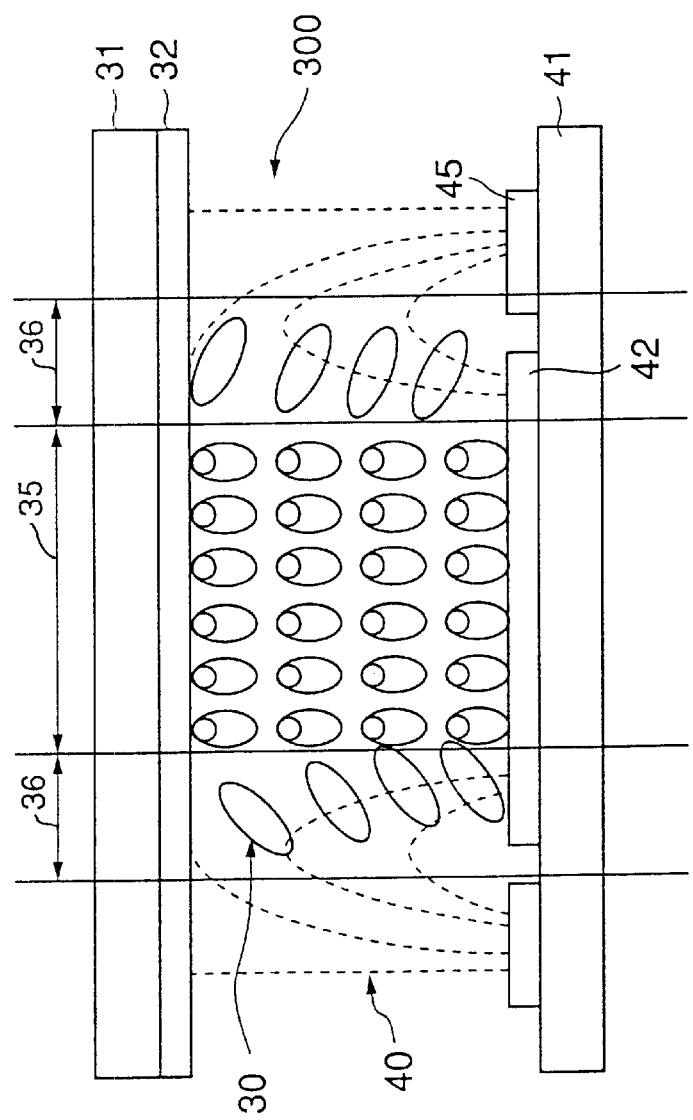

LIQUID CRYSTAL DISPLAY DEVICE

BACKGROUND OF THE INVENTION

1. Field of the Invention

The present invention generally relates to liquid crystal display devices, and more particularly to a homeotropic alignment type liquid crystal display device which is suited for use in electronic equipments such as television sets, personal computers, monitoring units and projection type display units (projectors).

2. Description of the Related Art

As thin film transistor (TFT) type liquid crystal display (LCD) devices, there twisted nematic (TN) type LCD devices which employ a normally white mode. FIGS. 1A and 1B are diagrams for explaining the operating principle of a TN type LCD panel structure. As shown in FIGS. 1A and 1B, alignment layers are provided on corresponding transparent electrodes 12 and 13 which are formed on corresponding glass substrates, with a difference of 90° in alignment directions, so as to sandwich TN liquid crystals therebetween. The liquid crystals contacting the alignment layer are arranged in the alignment direction of the alignment layer due to the nature of the liquid crystals. Hence, as shown in FIG. 1A, the liquid crystals are aligned such that the direction of the liquid crystal molecules is twisted by 90°. A pair of polarizing plates 11 and 15 are respectively arranged on respective sides of the transparent electrodes 12 and 13, in parallel with the alignment directions of the alignment layers.

When a non-polarized light 10 becomes incident to the LCD panel structure described above, the light passing through the polarizing plate 11 becomes a linearly polarized light before reaching the liquid crystals. Since the liquid crystal molecules are aligned with the 90° twist, the incident light is also twisted by 90° when passing through the liquid crystal molecules. As a result, the incident light passes through the lower polarizing plate 15. This state is referred to as a bright state.

Next, when a voltage is applied on the liquid crystal molecules by applying a voltage across the transparent electrodes 12 and 13 as shown in FIG. 1B, the liquid crystal molecules stand and the above described twist is eliminated. But since the alignment restricting force is strong at the alignment layer surface, the alignment direction of the liquid crystal molecules is still along the alignment layer. In such a state, the liquid crystal molecules are isotropic with respect to the passing light, and the polarizing direction of the linearly polarized light incident to the liquid crystals will not rotate. Accordingly, the linearly polarized light passing through the upper polarizing plate 11 cannot pass through the lower polarizing plate 15. This state is referred to as a dark state. Thereafter, when the voltage is no longer applied across the transparent electrodes 12 and 13, the liquid crystals return to the bright state due to the alignment restricting force.

On the other hand, as TFT type LCD devices, there are vertically aligned type LCD devices which employ a normally black mode. FIGS. 2A and 2B are diagrams for explaining the operating principle of a VA type LCD panel structure. As shown in FIG. 2A, alignment layers are provided on corresponding transparent electrodes 22 and 23 which are formed on corresponding glass substrates, with a difference of 180° in alignment directions, so as to sandwich negative type liquid crystals (liquid crystals having negative dielectric constant anisotropy) therebetween. A pair of polarizing plates 21 and 25 are respectively arranged on respective sides of the transparent electrodes 22 and 23, with a 45° difference to the alignment directions of the alignment layers. Axes of polarization of the two polarizing plates 21 and 25 are perpendicular to each other. As show in FIG. 2A, when no voltage is applied across the transparent electrodes 22 and 23 and thus no voltage is applied on the liquid crystal molecules, the liquid crystal molecules stand. However, because the alignment restricting force is strong at the alignment layer surface, the alignment direction of the liquid crystal molecules remain generally along the alignment layer (or slightly inclined to the alignment layer in some cases). In such a state, the liquid crystal molecules are isotropic with respect to the passing light. For this reason, when a non-polarized light 20 becomes incident to the LCD panel structure, the light passing through the polarizing plate 21 becomes a linearly polarized light before reaching the liquid crystals, but no change occurs in the polarized state of this linearly polarized light. Hence, the linearly polarized light passing through the upper polarizing plate 21 cannot pass through the lower polarizing plate 25, and thereby resulting in a dark state.

In addition, when a voltage is applied on the liquid crystals by applying a voltage across the transparent electrodes 22 and 23 as shown in FIG. 2B, the liquid crystals contacting the alignment layer are arranged along the alignment direction of the alignment layer due to the nature of the liquid crystals. Moreover, the liquid crystal molecules which are aligned cause other liquid crystal molecules to align thereto, and as a result, the liquid crystal molecules as a whole become aligned in one direction, that is, in an approximately horizontal direction with respect to the electrode surface. When the non-polarized light 20 becomes incident to the LCD panel structure, the light passing through the polarizing plate 21 becomes a linearly polarized light before reaching the liquid crystals. The light incident to the liquid crystal molecules can pass through the lower polarizing plate 25 due to a birefringence of the liquid crystals changing the polarized state, since a major axis direction of the liquid crystal molecules and the polarizing direction form an angle of 45° thereby resulting in a bright state. Thereafter, when the voltage is no longer applied across the transparent electrodes 22 and 23, the liquid crystals return to the dark state because the liquid crystal molecules become approximately vertically aligned (form an approximate homeotropic alignment) with respect to the electrode surface (substrate surface) due to the alignment restricting force.

Compared to the TN type LCD device, the VA type LCD device has a high display contrast, a high response speed, and satisfactory viewing angle characteristics with respect to white and black displays.

Conventionally, various alignment processes have been proposed to align the liquid crystals of the LCD panel depending on the alignment layer. However, because of the weak alignment restricting force, the alignment was easily disturbed due to effects of an electrical field and the like, and there was a problem in that a disclination is easily generated. The disclination refers to a part where the alignment of the liquid crystals becomes discontinuous. In addition, when a rubbing process is carried out to align the liquid crystals, the alignment restricting force becomes relatively strong, but unevenness is easily generated in the alignment, and it was difficult to stably align the liquid crystals.

SUMMARY OF THE INVENTION

Accordingly, it is a general object of the present invention to provide a novel and useful liquid crystal display device in which the problems described above are eliminated.

Another and more specific object of the present invention is to provide a liquid crystal display device which can suppress the disclination and stably align the liquid crystals.

Still another object of the present invention is to provide a homeotropic alignment type liquid crystal display device comprising first and second substrates confronting each other, first and second bus lines arranged in mutually perpendicular directions on the second substrate, liquid crystals provided between the first and second substrates, and first, second and third projecting structures restricting alignment of the liquid crystals, where the first projecting structures have a sloping surface which is inclined with respect to the first substrate and are provided on the first substrate in parallel with the first bus lines, the second projecting structures have a sloping surface which is inclined with respect to the second substrate and are provided on the second substrate in parallel with the first bus lines, and the third projecting structures have a sloping surface which is inclined with respect to at least one of the first and second substrate and are provided on at least one of the first and second substrates with an arrangement different from the first and second projecting structures. According to the liquid crystal display device of the present invention, it is possible to suppress the disclination by the structural alignment provided by the projecting structures, thereby enabling a stable alignment of the liquid crystals.

Other objects and further features of the present invention will be apparent from the following detailed description when read in conjunction with the accompanying drawings.

BRIEF DESCRIPTION OF THE DRAWINGS

FIG. 3 is a cross sectional view for explaining a disclination generated in a VA type LCD device;

DESCRIPTION OF THE PREFERRED EMBODIMENTS

Figure 1A:
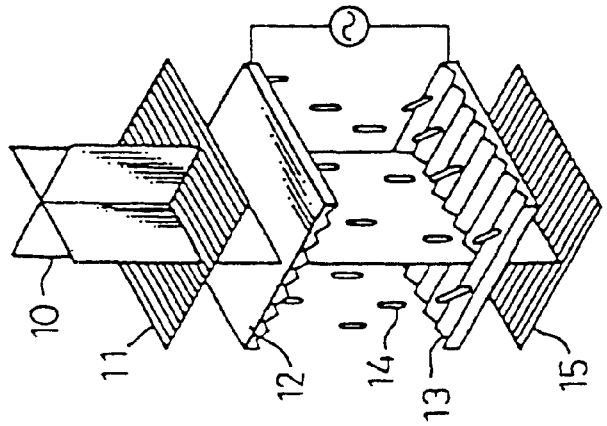
FIGS. 1A and 1B respectively are diagrams for explaining the operating principle of a TN type LCD panel structure.
Figure 1B:
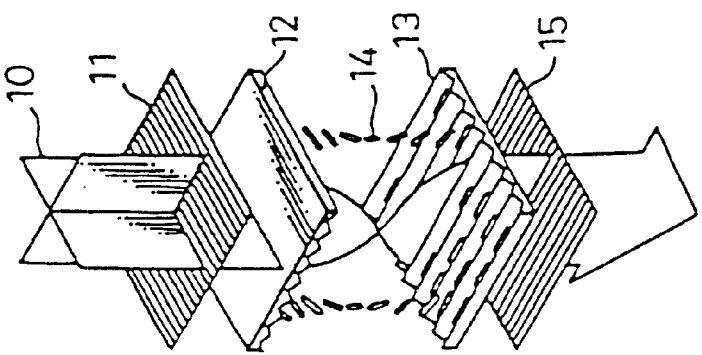

First, a description will be given of a VA type LCD device to which the present invention is applicable, by referring to FIGS. 3 through 6. FIG. 3 is a cross sectional view for explaining a disclination which is generated in the VA type LCD device, and shows a liquid crystal panel excluding polarizing plates of the VA type LCD device.

In FIG. 3, a transparent electrode 32 is formed on a glass substrate 31, and a transparent electrode 42 and a data bus line 45 are formed on a glass substrate 41. A surface of the transparent electrode 32 contacting a liquid crystal layer is subjected to a homeotropic alignment process so that a homeotropic alignment layer (not shown) is formed thereon. Similarly, surfaces of the glass substrate 41, the transparent electrode 42 and the data bus line 45 contacting the liquid crystal layer are subjected to a homeotropic alignment process so that a homeotropic alignment layer (not shown) is formed thereon. When a voltage is applied across the transparent electrode 32 on the opposing glass substrate 31 and the transparent electrode 42 on the TFT glass substrate 41, liquid crystal molecules 30 which form a liquid crystal layer 300 become aligned in a normal alignment region 35 depending on the applied voltage. FIG. 3 shows a state where the liquid crystal molecules 30 are aligned vertically. On the other hand, when viewed from the data bus line 45 on the glass substrate 41, an electric field 40 indicated by broken lines is generated. For this reason, a region 36 in which the alignment is disturbed, that is, a disclination, is generated on both sides of the normal alignment region 35 due to the generated electric field.

Figure 4A:
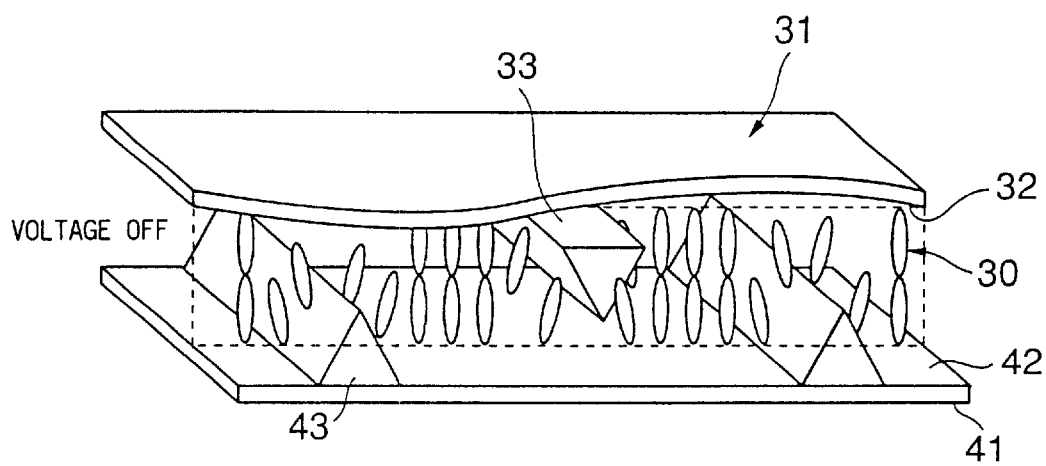
FIGS. 4A and 4B respectively are cross sectional views for explaining a case where a bank is provided on a transparent electrode of a VA type LCD device.
Figure 4B:
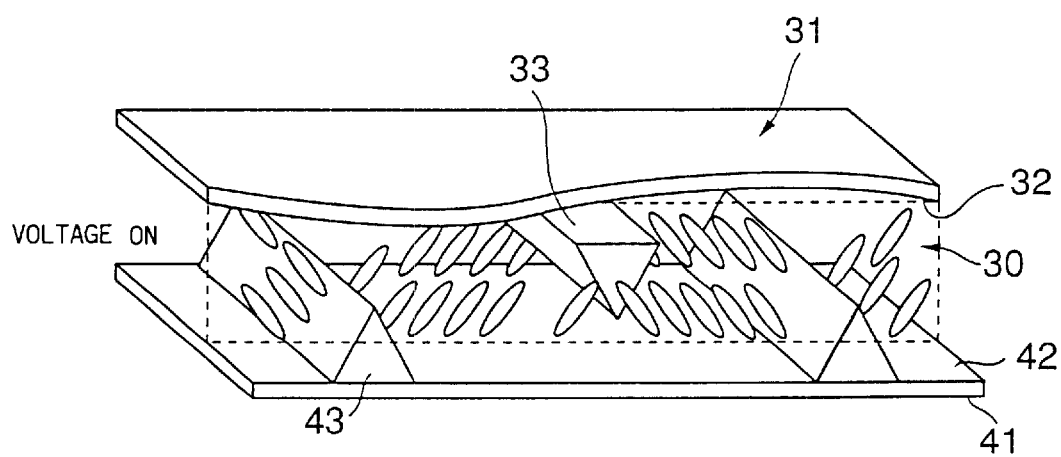

In order to reduce the disclination region, it is conceivable to provide banks 33 and 43 on the confronting transparent electrodes 32 and 42 as shown in FIGS. 4A and 4B. In FIGS. 4A and 4B, those parts which are the same as those corresponding parts in FIG. 3 are designated by the same reference numerals, and a description thereof will be omitted. FIG. 4A shows a state where no voltage is applied across the transparent electrodes 32 and 42, and FIG. 4B shows a state where a voltage is applied across the transparent electrodes 32 and 42.

In this specification, a "bank" refers to a projecting structure having a sloping surface which is inclined with respect to the substrate surface. This "bank" is made up of a dielectric (insulator), and is provided on an electrode (on the side of a liquid crystal layer from the electrode).

Figure 5:
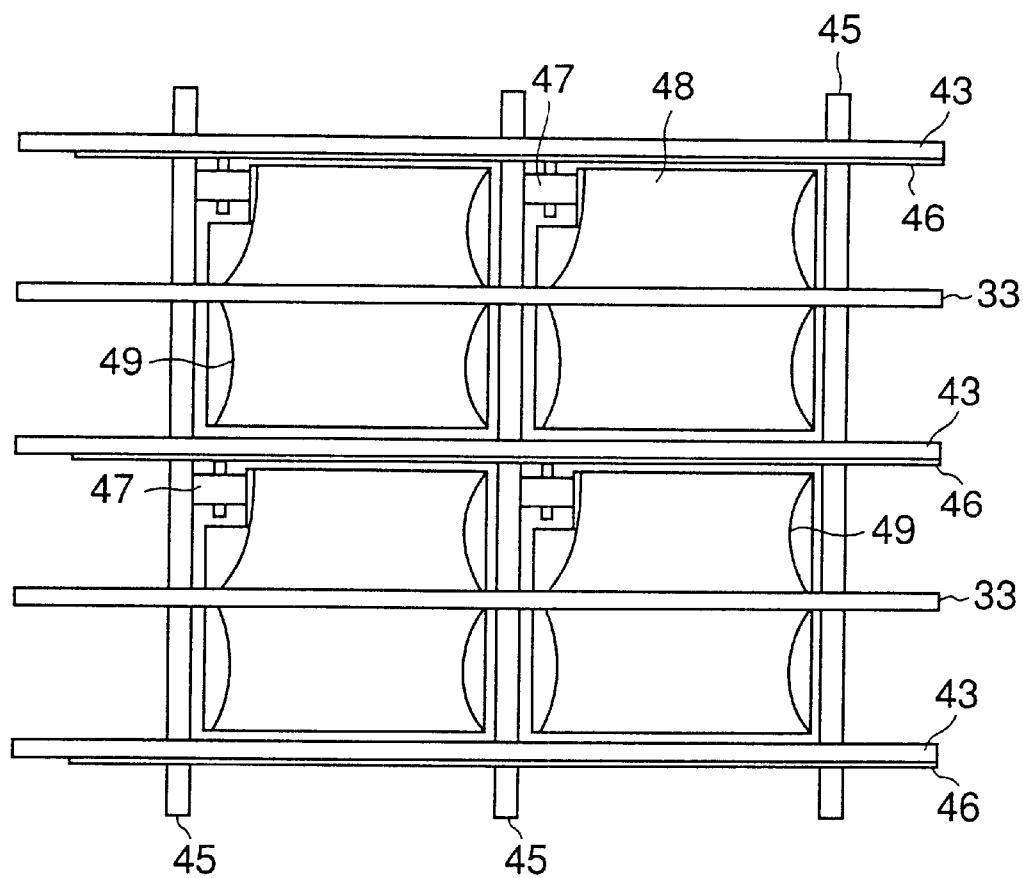
FIG. 5 is a plan view showing the VA type LCD device shown in FIGS. 4A and 4B.

FIG. 5 is a plan view showing the VA type LCD device shown in FIGS. 4A and 4B. In FIG. 5, those parts which are the same as those corresponding parts in FIGS. 4A and 4B are designated by the same reference numerals, and a description thereof will be omitted. In FIG. 5, the data bus lines 45, gate bus lines 46 and TFTs 47 are provided on the glass substrate 41. Pixel regions 48 are formed at locations shown in FIG. 5. The banks 33 and 43 are provided in parallel to the gate bus lines 46. However, according to the structure shown in FIG. 5, the present inventors found that disclinations 49 are generated along the data bus lines 45.

Figure 6:
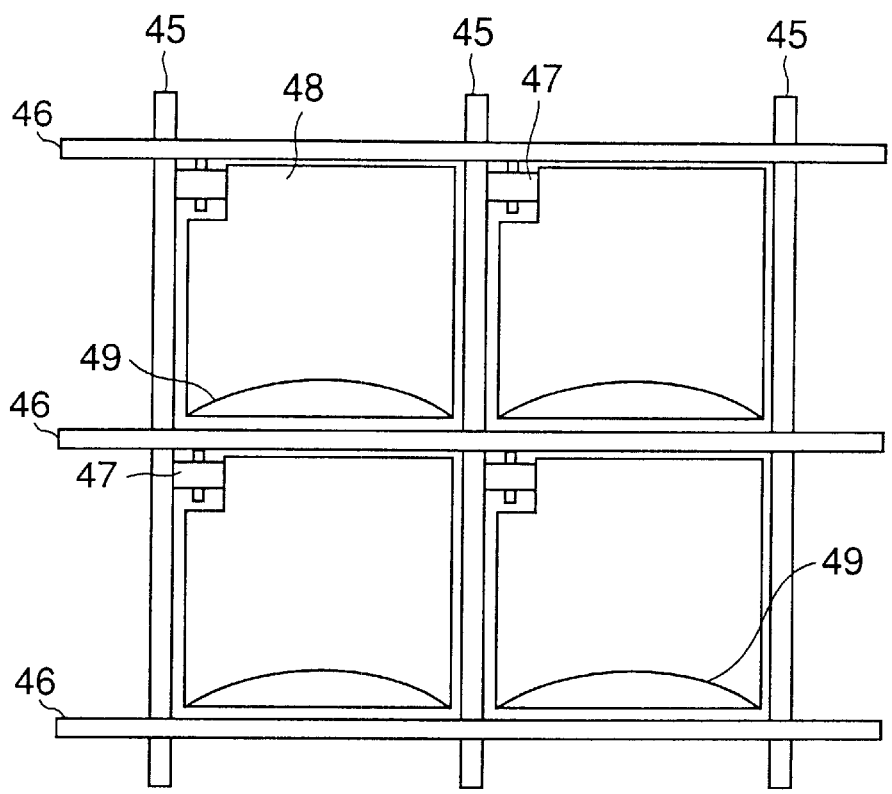
FIG. 6 is a plan view for explaining the disclination for a case where an alignment process is carried out by irradiating an ultra violet ray from a direction oblique to a homeotropic alignment layer.

On the other hand, when an alignment process is carried out by irradiating an ultra violet ray obliquely with respect to the homeotropic alignment layer, the present inventors found that the disclinations 49 are generated along the gate bus lines 46 as shown in FIG. 6. In FIG. 6, those parts which are the same as those corresponding parts in FIG. 5 are designated by the same reference numerals, and a description thereof will be omitted.

Accordingly, the liquid crystal display device according to the present invention is designed to suppress the disclinations described above.

Figure 7:
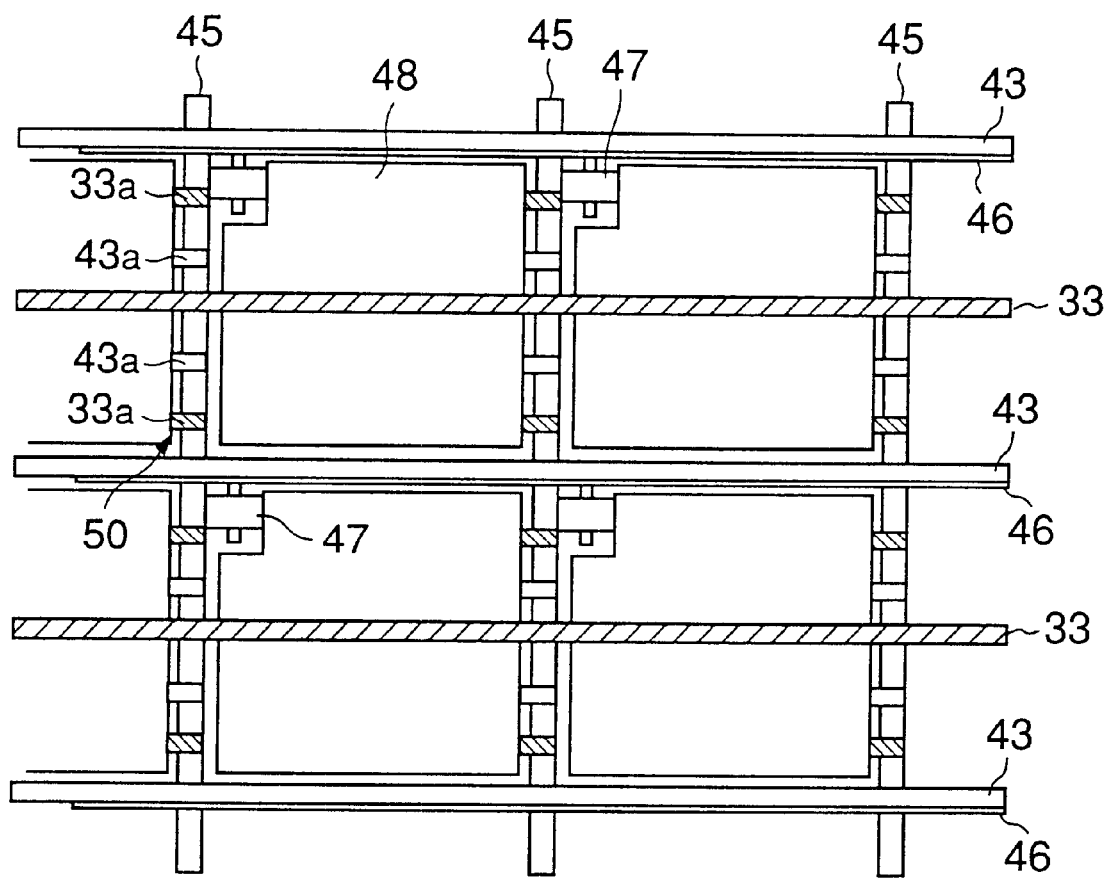
FIG. 7 is a plan view showing an important part of a first embodiment of a liquid crystal display device according to the present invention.

FIG. 7 is a plan view showing an important part of a first embodiment of the liquid crystal display device according to the present invention. In FIG. 7, those parts which are the same as those corresponding parts in FIGS. 3 through 6 are designated by the same reference numerals, and a description thereof will be omitted. In the following description, the liquid crystal display device according to the present invention is made up at least of a liquid crystal panel.

In this embodiment, assisting banks 33a and 43a are alternately provided along the data bus lines 45 in non-pixel regions 50 other than the pixel regions 48. The assisting banks 33a are provided on the side of the transparent electrode 32 on the glass substrate 31, while the assisting banks 43a are provided on the side of the transparent electrode 42 on the glass substrate 41. In addition, the pitch of the banks 33 and 43 in the pixel regions 48 is set to 80 μm, for example, while the pitch of the assisting banks 33a and 43a in the non-pixel regions 50 is set to 25 μm, for example. In other words, because the pitch of the assisting banks 33a and 43a in the non-pixel regions 50 is set smaller than the pitch of the banks 33 and 43 in the pixel regions 48, it is possible to increase the alignment restricting force in the vicinities of the data bus lines 45 so as to reduce the effects of the electric field generated by the data bus lines 45.

Figure 8:
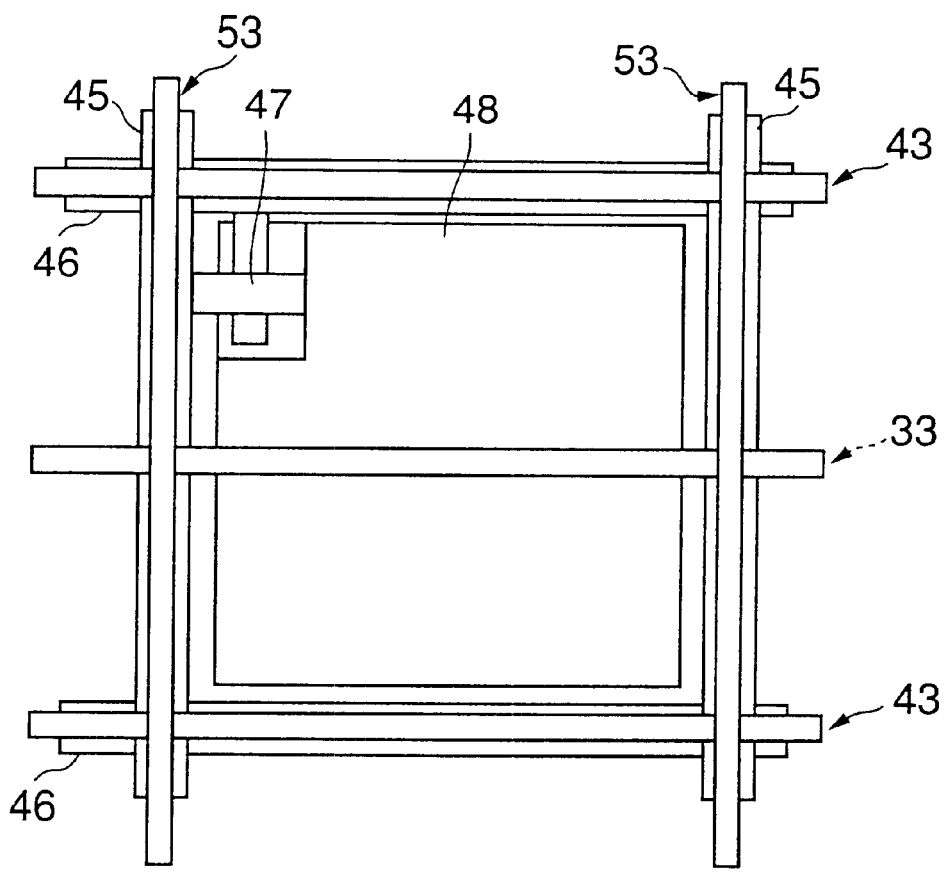
FIG. 8 is a plan view showing an important part of a second embodiment of the liquid crystal display device according to the present invention.

FIG. 8 is a plan view showing an important part of a second embodiment of the liquid crystal display device according to the present invention. In FIG. 8, those parts which are the same as those corresponding parts in FIGS. 3 through 6 are designated by the same reference numerals, and a description thereof will be omitted.

In this embodiment, assisting banks 53 are provided in parallel to the data bus lines 45. The assisting banks 53 are provided on the side of the transparent electrode 32 on the glass substrate 31. By providing the assisting banks 53 which extend in a direction perpendicular to the banks 33 and 43, it becomes possible to effectively suppress the disclinations.

For example, the pitch of the banks 33 and 43 in this embodiment is 40 $\mu$m, while the pitch of the assisting banks 53 is 80 $\mu$m. In addition, the widths of the banks 33, 43 and 53 along a direction approximately parallel to the glass substrates 31 and 41 respectively are 5 $\mu$m, and the heights of the banks 33, 43 and 53 along a direction approximately perpendicular to the glass substrates 31 and 41 respectively are 1 $\mu$m, for example.

Figure 9:
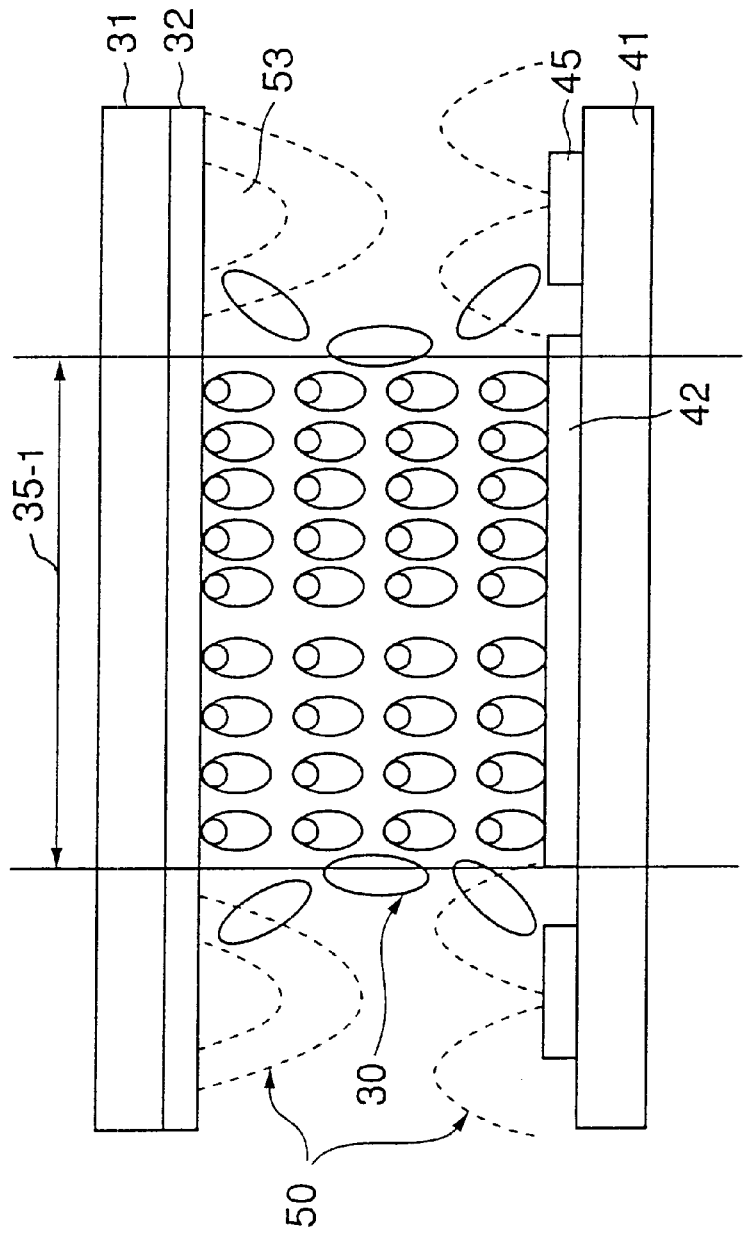
FIG. 9 is a cross sectional view for explaining the disclination generated in the second embodiment.

FIG. 9 is a cross sectional view for explaining the disclination generated in this embodiment. In FIG. 9, those parts which are the same as those corresponding parts in FIGS. 3 and 8 are designated by the same reference numerals, and a description thereof will be omitted.

In FIG. 9, when a voltage is applied across the transparent electrode 32 on the glass substrate 31 and the transparent electrode 42 on the glass substrate 41, the liquid crystal molecules 30 in a normal alignment region 35-1 are aligned vertically, for example, with respect to the transparent electrodes 32 and 42. In addition, when viewed from the data bus line 45 on the glass substrate 41, an electric field 50 is generated as indicated by broken lines in FIG. 9. Hence, a disclination region on both sides of the normal alignment region 35-1 is greatly reduced compared to the case shown in FIG. 3, and the normal alignment region 35-1 is increased compared to the normal alignment region 35 shown in FIG. 3.

The present inventors assembled this embodiment of the liquid crystal display device into a liquid crystal panel projection type display unit (projector), and compared the performance thereof with the performance of a comparable liquid crystal panel projection type display unit (projector) which is assembled with a conventional TN type liquid crystal display device. It was confirmed that a contrast ratio (CR) is approximately 100 for the projector assembled with the conventional TN type liquid crystal display device, but the CR can be improved to CR>300 for the projector assembled with this embodiment of the liquid crystal display device.

Of course, as a modification of this embodiment, it is possible to overlap the assisting bank on the side of the glass substrate 31 and the bank on the side of the glass substrate 41, so as not to provide a spacer. In this case, it is possible to prevent the alignment from being disturbed by the spacer.

Figure 10:
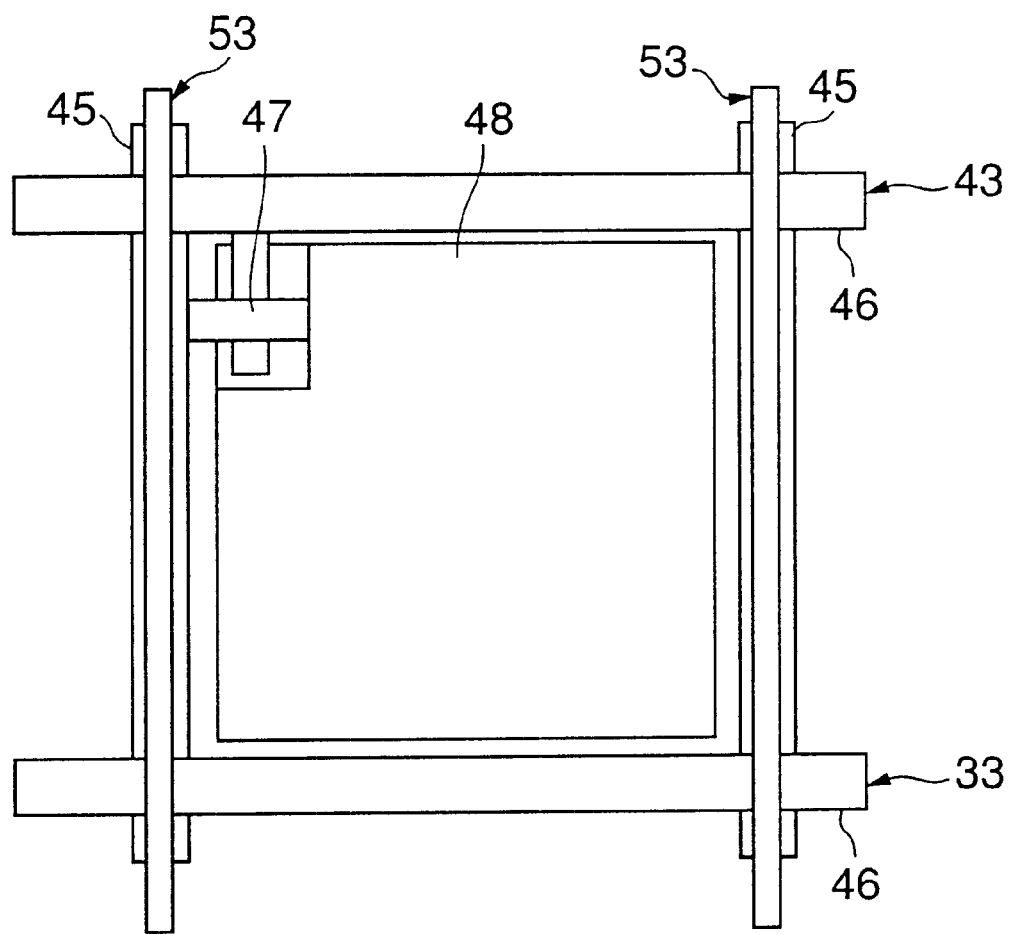
FIG. 10 is a plan view showing an important part of a third embodiment of the liquid crystal display device according to the present invention.

FIG. 10 is a plan view showing an important part of a third embodiment of the liquid crystal display device according to the present invention. In FIG. 10, those parts which are the same as those corresponding parts in FIG. 8 are designated by the same reference numerals, and a description thereof will be omitted.

In this embodiment, the pitch of the banks 33 and 43 and the pitch of the assisting banks 53 are both 80 $\mu$m, for example. In addition, the widths of the banks 33 and 43 along a direction approximately parallel to the glass substrates 31 and 41 respectively are 10 $\mu$m, for example, and the heights of the banks 33 and 43 along a direction approximately perpendicular to the glass substrates 31 and 41 respectively are 1.5 $\mu$m, for example. On the other hand, the width of the assisting bank 53 in the direction approximately parallel to the glass substrates 31 and 41 is 5 $\mu$m, for example, and the height of the assisting bank 53 in the direction approximately perpendicular to the glass substrates 31 and 41 is 1 $\mu$m, for example.

According to this embodiment, it is possible to reduce the disclinations particularly in the vicinities of the data bus lines 45.

Figure 11:
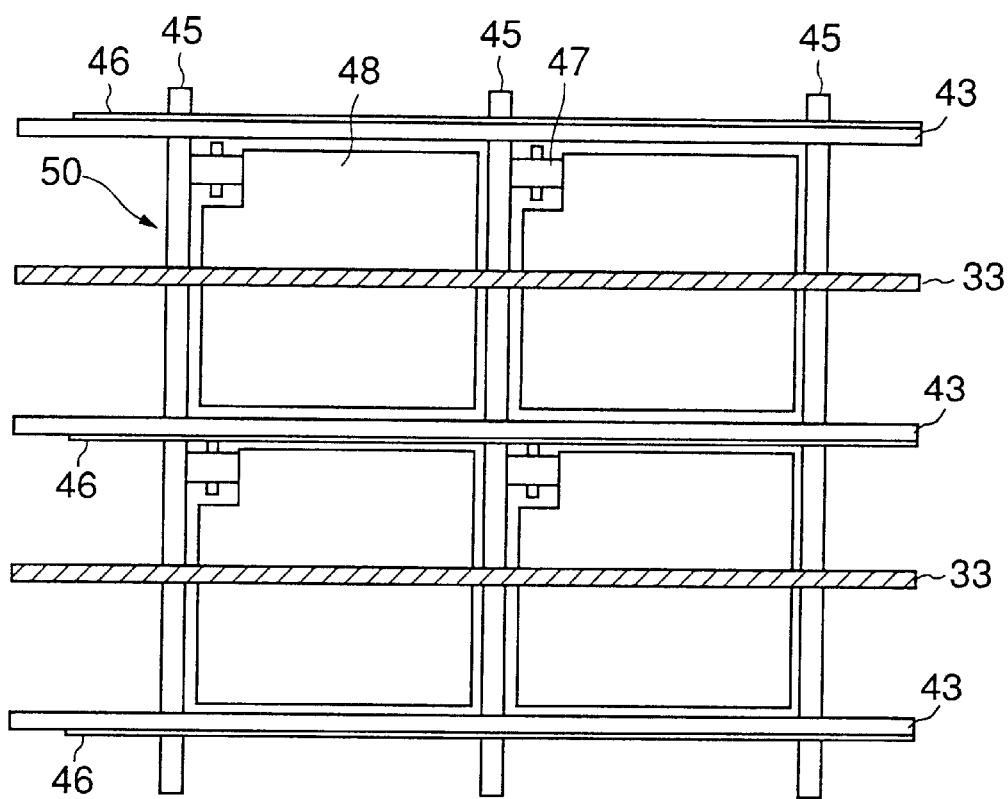
FIG. 11 is a plan view showing an important part of a fourth embodiment of the liquid crystal display device according to the present invention.

FIG. 11 is a plan view showing an important part of a fourth embodiment of the liquid crystal display device according to the present invention. In FIG. 11, those parts which are the same as those corresponding parts in FIG. 7 are designated by the same reference numerals, and a description thereof will be omitted.

In this embodiment, an alignment process such as an optical alignment process and a rubbing process is carried out within the non-pixel regions 50 in a direction parallel to the gate bus lines 46, with respect to the alignment layer on the side of the glass substrate 31 confronting the data bus lines 45. By carrying out the alignment process having a strong alignment restricting force in the vicinities of the data bus lines 45 where the disclinations are easily generated, it becomes possible to reduce the disclinations in the vicinities of the data bus lines 45.

The present inventors assembled this embodiment of the liquid crystal display device into a liquid crystal panel projection type display unit (projector), and compared the performance thereof with the performance of a comparable liquid crystal panel projection type display unit (projector) which is assembled with a conventional TN type liquid crystal display device. It was confirmed that the CR is approximately 100 for the projector assembled with the conventional TN type liquid crystal display device, but the CR can be improved to CR>300 for the projector assembled with this embodiment of the liquid crystal display device.

Figure 12:
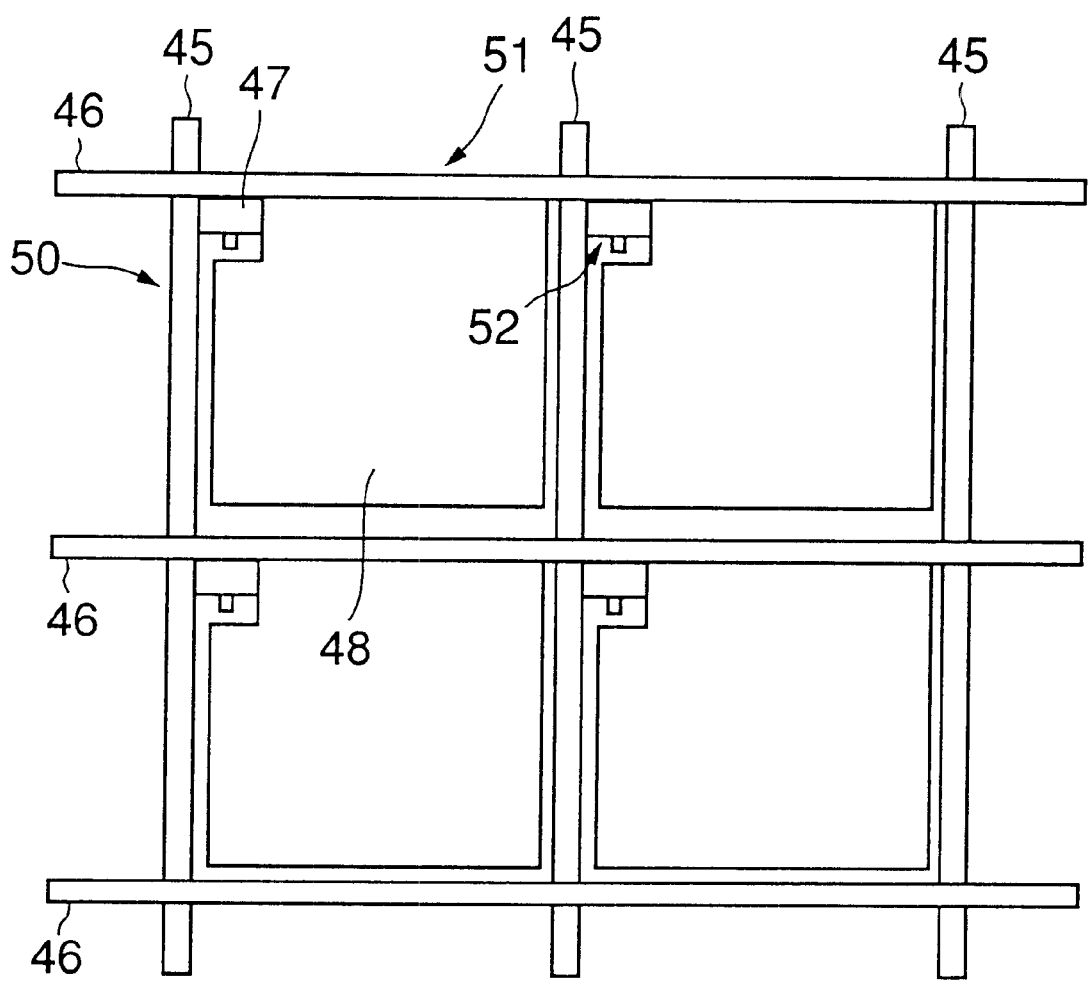
FIG. 12 is a plan view showing an important part of a fifth embodiment of the liquid crystal display device according to the present invention.

FIG. 12 is a plan view showing an important part of a fifth embodiment of the liquid crystal display device according to the present invention. In FIG. 12, those parts which are the same as those corresponding parts in FIG. 7 are designated by the same reference numerals, and a description thereof will be omitted.

In this embodiment, a rubbing process is carried out within regions other than the pixel region 48, in the same direction as the optical alignment made by the alignment layers, with respect to the alignment layers on the glass substrates 31 and 41. More particularly, the rubbing process is carried out in the same direction as the optical alignment made by the alignment layer, with respect to the alignment layer in the non-pixel regions 50 confronting the data bus lines 45, non-pixel regions 51 confronting the gate bus lines 46, and non-pixel regions 52 confronting the TFTs 47. As a result, it is possible to reduce the disclinations in the vicinities of the data bus lines 45, the gate bus lines 46 and the TFTs 47.

Figure 13:
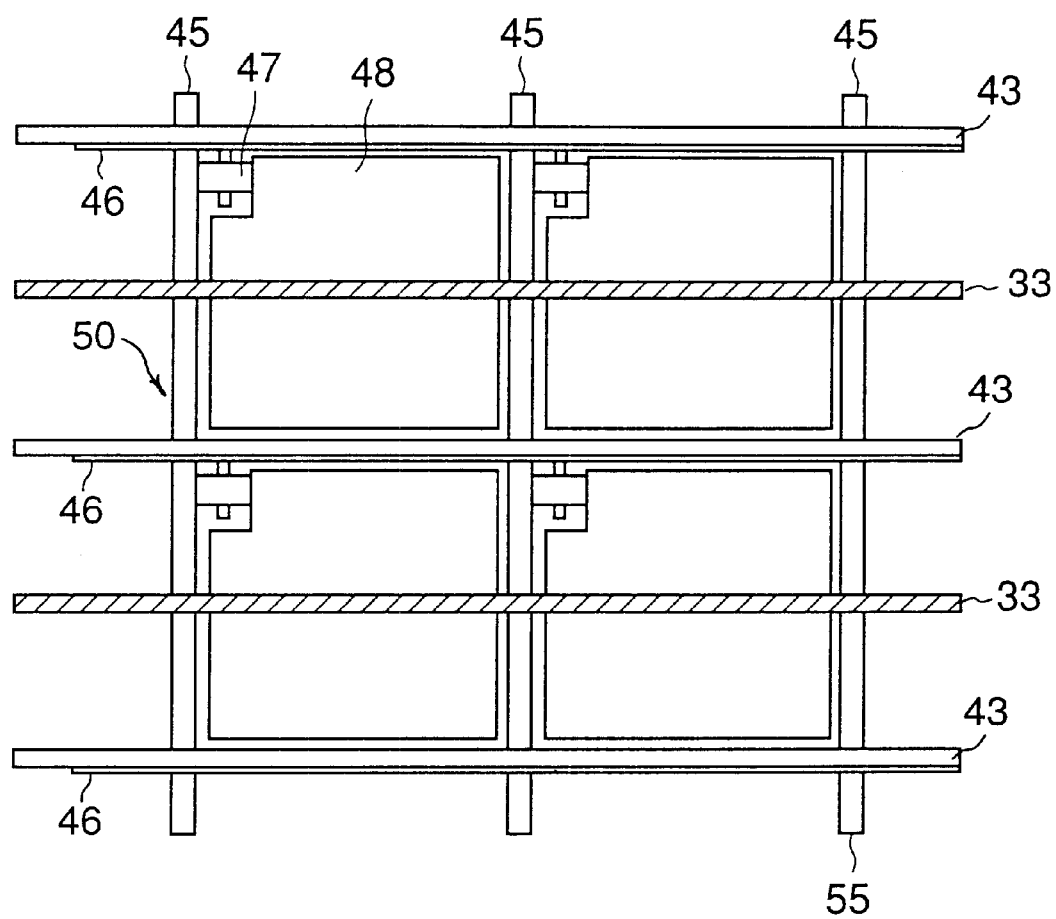
FIG. 13 is a plan view showing an important part of a sixth embodiment of the liquid crystal display device according to the present invention.

FIG. 13 is a plan view showing an important part of a sixth embodiment of the liquid crystal display device according to the present invention. In FIG. 13, those parts which are the same as those corresponding parts in FIG. 11 are designated by the same reference numerals, and a description thereof will be omitted.

In this embodiment, a resist resin layer 55, which is an insulating member, is provided within the non-pixel regions 50, that is, on the data bus lines 45. The resist resin layer 55 blocks the electric field generated by the data bus lines 45, so that it is possible to reduce the disclinations in the vicinities of the data bus lines 45.

Figure 14:
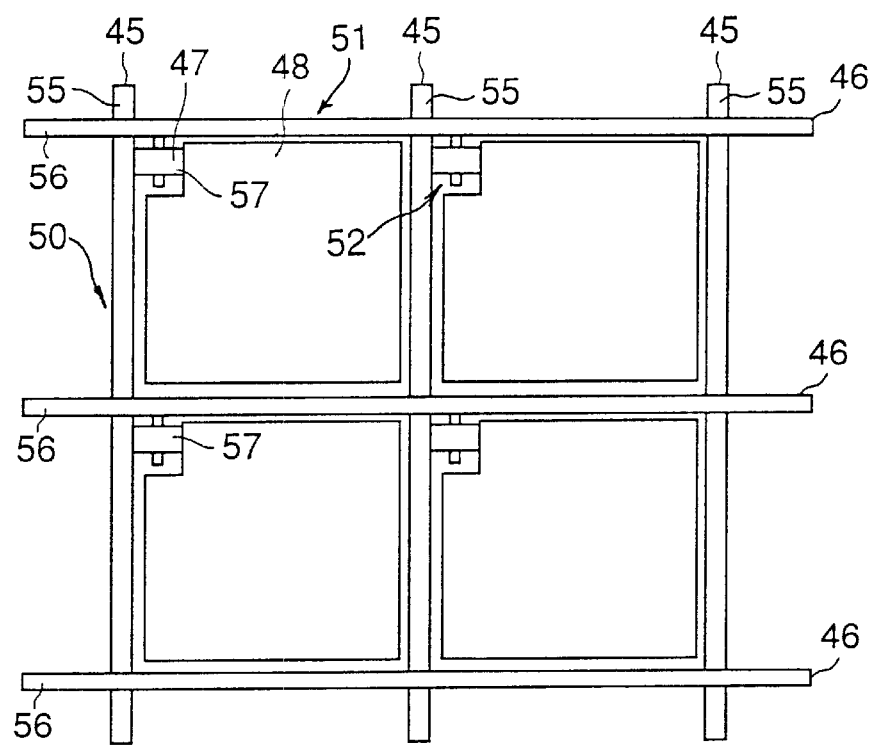
FIG. 14 is a plan view showing an important part of a seventh embodiment of the liquid crystal display device according to the present invention.

FIG. 14 is a plan view showing an important part of a seventh embodiment of the liquid crystal display device according to the present invention. In FIG. 14, those parts which are the same as those corresponding parts in FIGS. 12 and 13 are designated by the same reference numerals, and a description thereof will be omitted.

In this embodiment, resist resin layers 55, 56 and 57, which are insulating members, are respectively provided within the non-pixel regions 50, 51 and 52 which are other than the pixel regions 48. More particularly, the resist resin layer 55 is provided on the data bus lines 45, the resist resin layer 56 is provided on the gate bus lines 46, and the resist resin layer 57 is provided on the TFTs 47. Because the resist resin layers 55, 56 and 57 respectively block the electric fields generated by the data bus lines 45, the gate bus lines 46 and the TFTs 47, it is possible to reduce the disclinations in the vicinities of the data bus lines 45, the gate bus lines 46 and the TFTs 47.

Figure 2A:
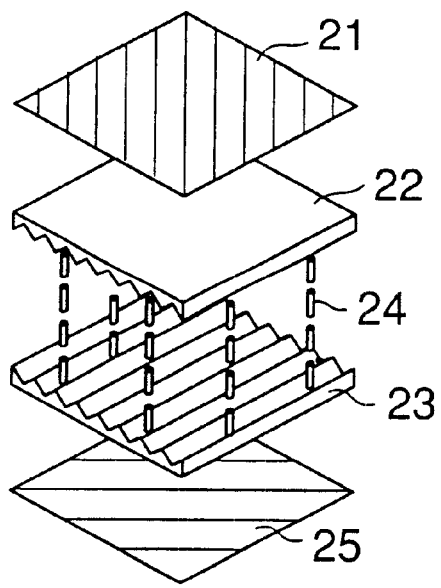
FIGS. 2A and 2B respectively are diagrams for explaining the operating principle of a VA type LCD panel structure.
Figure 2B:
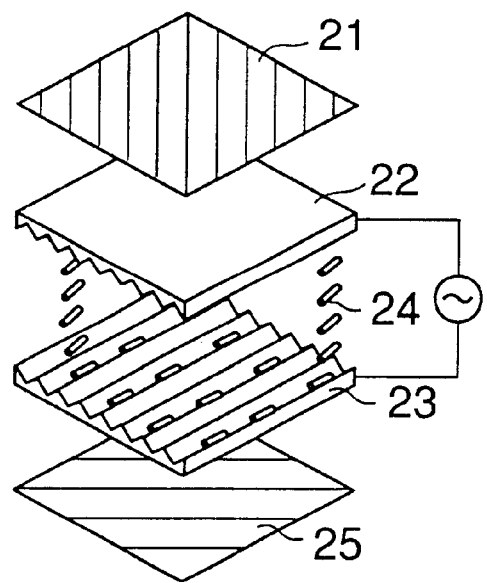
Figure 15:
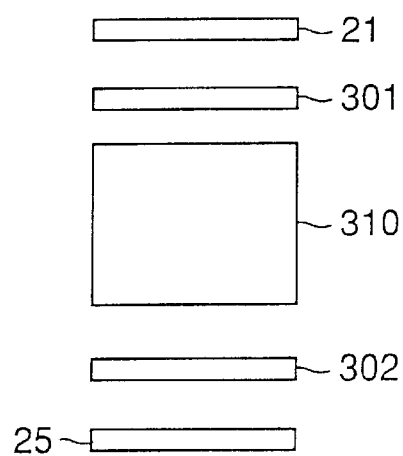
FIG. 15 is a cross sectional view showing an important part of an eighth embodiment of the liquid crystal display device according to the present invention.

FIG. 15 is a cross sectional view showing an important part of an eighth embodiment of the liquid crystal display device according to the present invention. In FIG. 15, those parts which are the same as those corresponding parts in FIG. 2 are designated by the same reference numerals, and a description thereof will be omitted.

In this embodiment, both films 301 and 302 having a negative refractive index anisotropy are arranged or, at least one of the films 301 and 302 is arranged, between a liquid crystal panel 310 having a construction according to any of the embodiments described above and the polarizing plates 21 and 25. In addition, a total of $\Delta nd((nx+ny)/2-nz)d)$ of the films 301 and 302 in this embodiment is the same as the $\Delta nd$ of the liquid crystal panel 310, where d indicates the cell thickness, and $\Delta n=n//-n\perp$.

Figure 16:
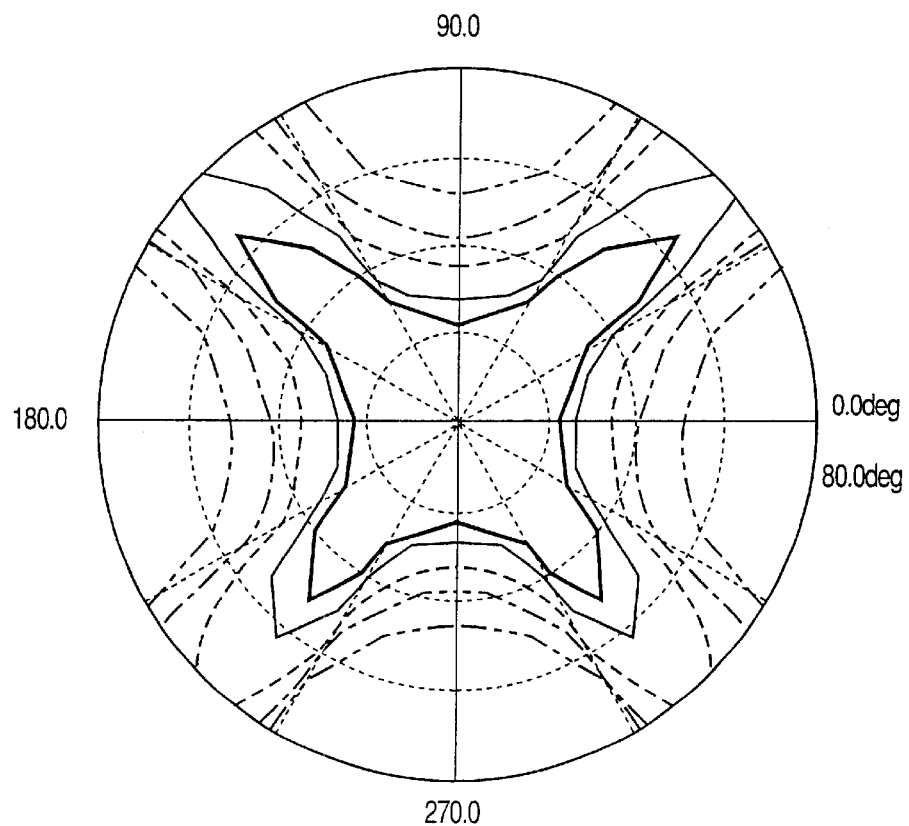
FIG. 16 is a diagram showing viewing angle characteristics of a liquid crystal display device having no film shown in FIG. 15.
Figure 17:
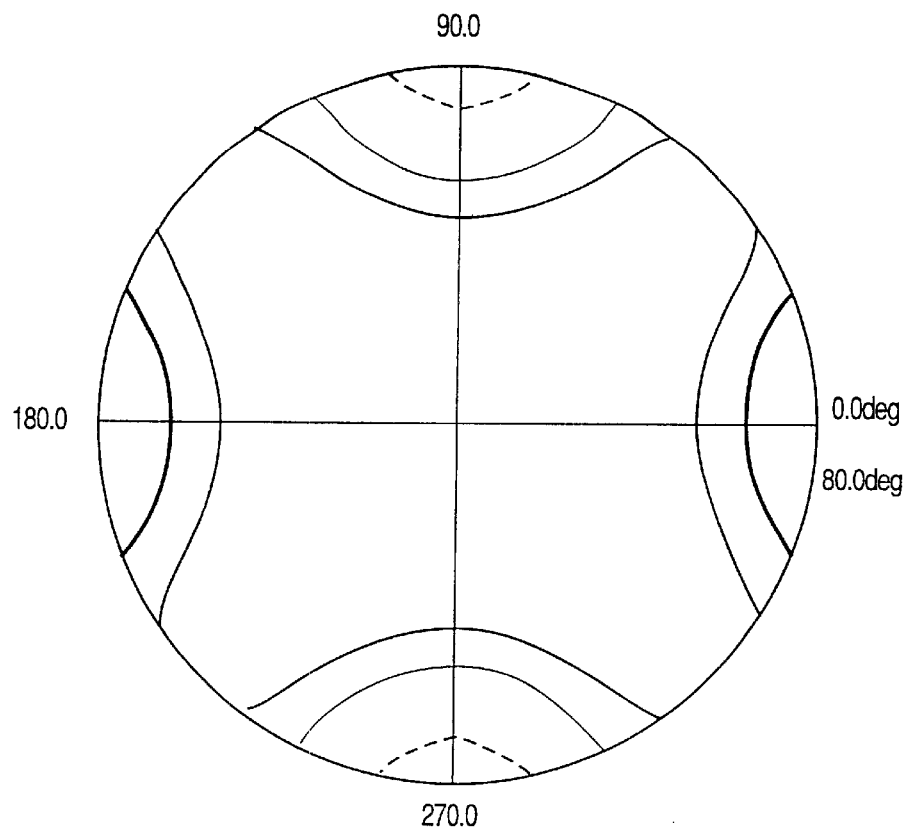
FIG. 17 is a diagram showing viewing angle characteristics of a liquid crystal display device having the film shown in FIG. 15.

FIG. 16 is a diagram showing viewing angle characteristics of a liquid crystal display device in which the films 301 and 302 shown in FIG. 15 are not provided. On the other hand, FIG. 17 is a diagram showing viewing angle characteristics of a liquid crystal display device in which the films 301 and 302 shown in FIG. 15 are provided. As may be seen by comparing FIG. 17 with FIG. 16, a range in which CR>10 is greatly increased according to this embodiment, and the present inventors confirmed that it is possible to realize a liquid crystal display device having a satisfactory characteristic according to this embodiment.

Figure 18:
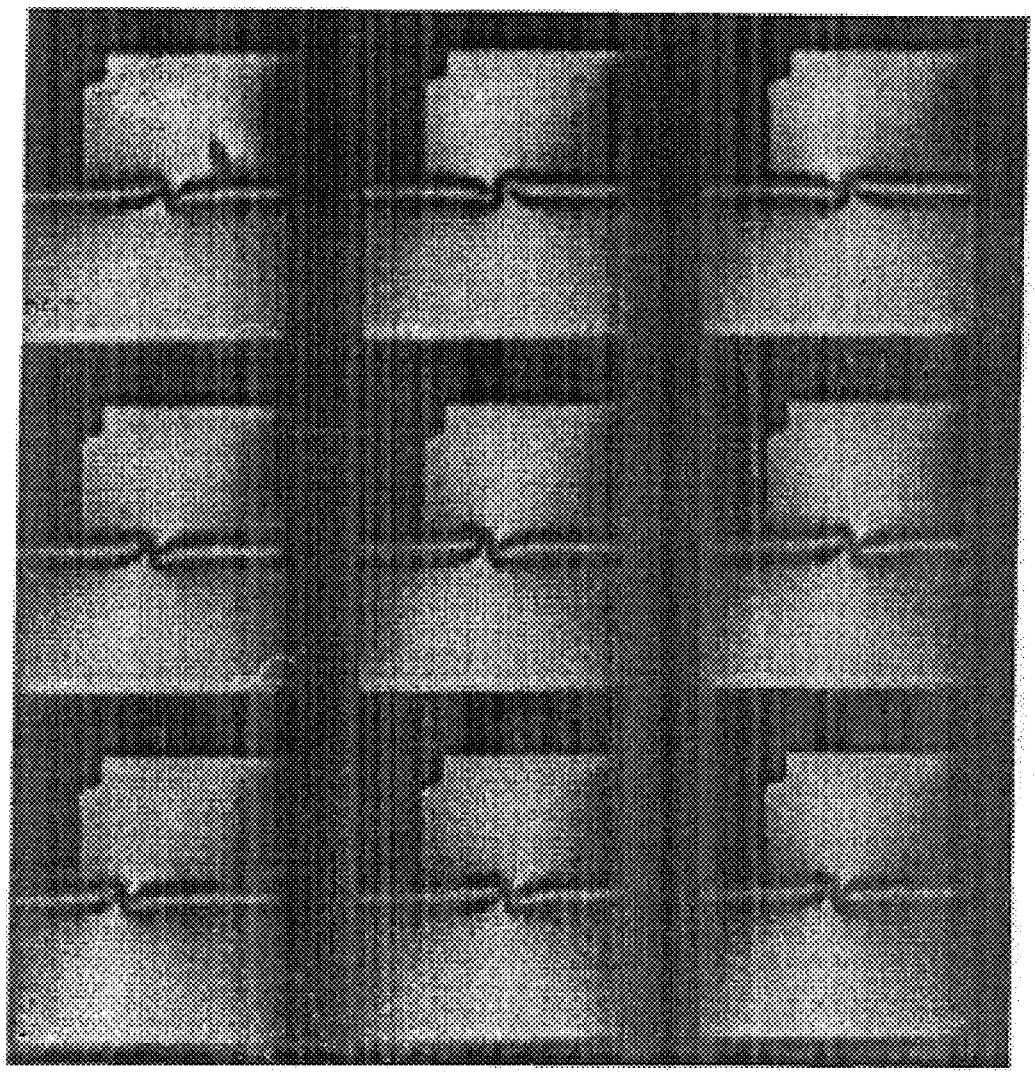
FIG. 18 is a diagram showing the disclination for the first embodiment.
Figure 19:
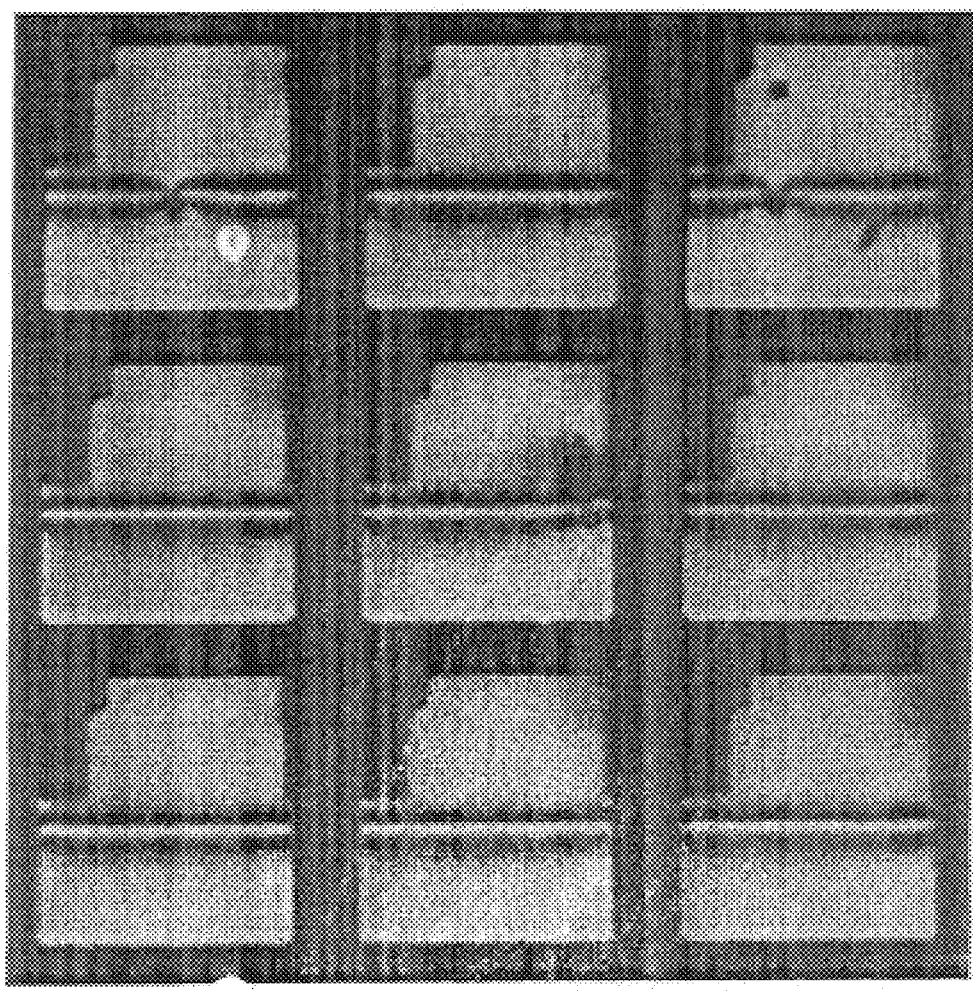
FIG. 19 is a diagram showing the disclination for the second embodiment.
Figure 20:
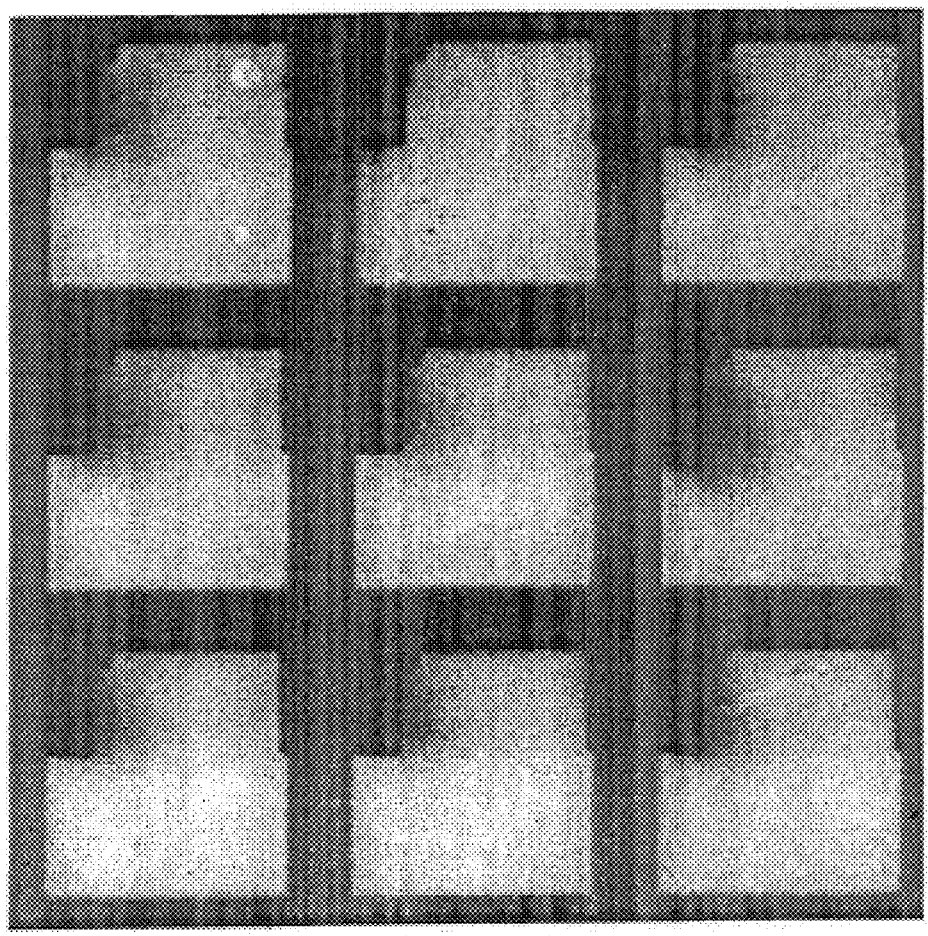
FIG. 20 is a diagram showing the disclination for the third embodiment.

Next, a description will be given of data which were obtained by the present inventors through experiments. FIGS. 18 through 20 are diagrams (photographs) showing the experimental data.

FIG. 18 is a diagram showing the disclinations for the first embodiment shown in FIG. 7, and black portions indicate portions where the alignment defect is generated.

FIG. 19 is a diagram showing the disclinations for the second embodiment shown in FIG. 8, and black portions indicate portions where the alignment defect is generated.

FIG. 20 is a diagram showing the disclinations for the third embodiment shown in FIG. 9, and black portions indicate portions where the alignment defect is generated.

As may be seen from FIGS. 18 through 20, it was confirmed that the generation of the alignment defect, that is, the generation of the disclination, is effectively suppressed according to the embodiments described above.

Next, a description will be given of a ninth embodiment of the liquid crystal display device according to the present invention.

Figure 21:
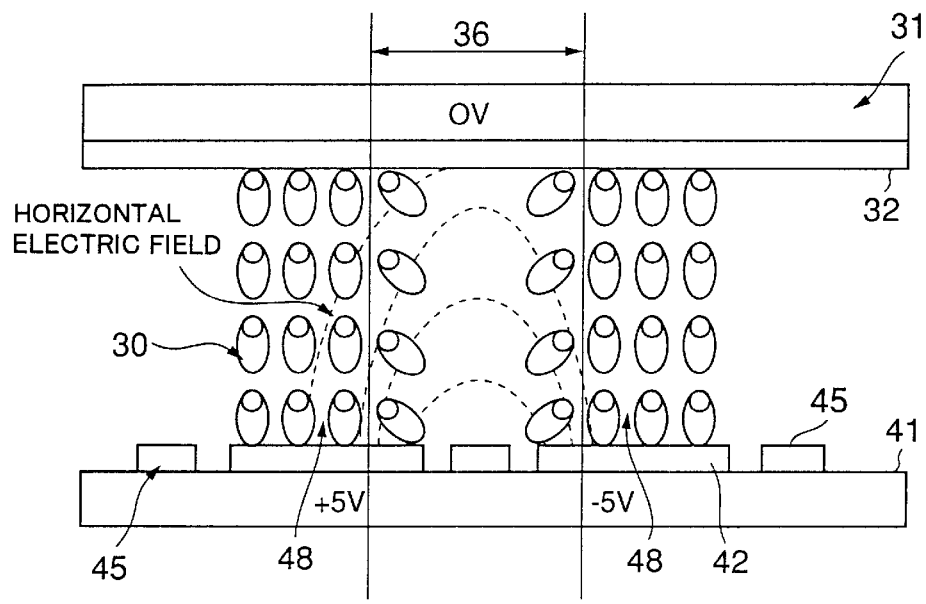
FIG. 21 is a cross sectional view for explaining a driving voltage applied in an adjacent pixel region of the second embodiment.

In the second embodiment described above, the voltage applied across the transparent electrodes 32 and 42, that is, the driving voltage, is set to opposite polarities between mutually adjacent pixel regions 48 as shown in FIG. 21. In FIG. 21, those parts which are the same as those corresponding parts in FIG. 9 are designated by the same reference numerals, and a description thereof will be omitted. In the case shown in FIG. 21, a driving voltage of +5 V is applied in the pixel region 48 on the left side, and a driving voltage of −5 V is applied in the pixel region 48 on the right side.

Figure 22:
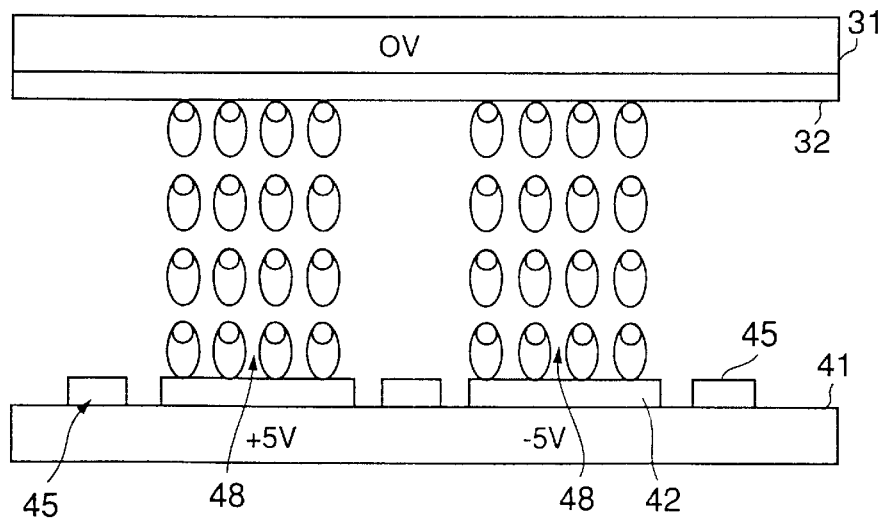
FIG. 22 is a cross sectional view for explaining a driving voltage applied in an adjacent pixel region of a ninth embodiment of the liquid crystal display device according to the present invention.

On the other hand, in this ninth embodiment, the polarity of the driving voltage is set to the same polarity between the mutually adjacent pixel regions 48 as shown in FIG. 22. In FIG. 22, those parts which are the same as those corresponding parts in FIG. 21 are designated by the same reference numerals, and a description thereof will be omitted.

As shown in FIG. 22, the driving voltage of +5 V is applied in the pixel region 48 on the left side, and the driving voltage of +5 V is also applied in the pixel region 48 on the right side. For this reason, compared to the case shown in FIG. 21, the alignment of the liquid crystal molecules 30 is further improved at a boundary part of the mutually adjacent pixel regions 48. This further improvement of the alignment of the liquid crystal molecules 30 at the boundary part is obtained, because the potential difference of the driving voltages between the mutually adjacent pixel regions 48 is small, thereby making the electric field generated in the horizontal direction in FIG. 22 small and reducing the effects of the electric field on the alignment of the liquid crystal molecules 30.

Next, a description will be given of a tenth embodiment of the liquid crystal display device according to the present invention, by referring to FIGS. 23 through 25. This embodiment combines a bank alignment (structural alignment) which uses the bank to align the liquid crystal molecules, and the optical alignment which optically aligns the liquid crystal molecules.

Figure 23:
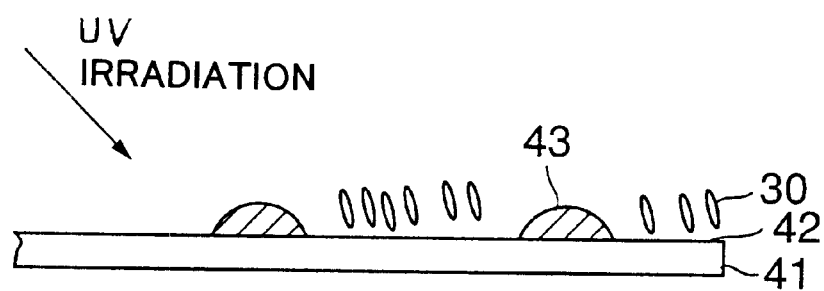
FIG. 23 is a cross sectional view for explaining a process of irradiating an ultra violet ray with respect to a substrate having a bank in a tenth embodiment of the liquid crystal display device according to the present invention.
Figure 24:
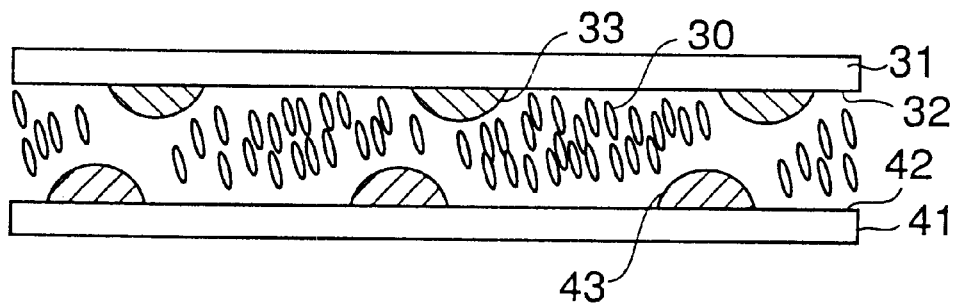
FIG. 24 is a cross sectional view showing an important part of the tenth embodiment.

FIG. 23 is a cross sectional view for explaining a process of irradiating an ultra violet ray with respect to a substrate having banks in this embodiment of the liquid crystal display device. FIG. 24 is a cross sectional view showing an important part of this embodiment. In addition, FIG. 25 is a plan view showing an important part of this embodiment. FIG. 23 is a cross sectional view along a line A-B in FIG. 25, and FIG. 24 is a cross sectional view along a line C-D in FIG. 25. In FIGS. 23 through 25, those parts which are the same as those corresponding parts in FIGS. 3 through 5 are designated by the same reference numerals, and a description thereof will be omitted.

In this embodiment, an alignment process which irradiates an ultra violet ray is carried out with respect to the TFT glass substrate 41 having the banks 43 formed thereon, and a similar alignment process is also carried out with respect to the opposing glass substrate 31 having the banks 33 formed thereon, as shown in FIG. 23. Accordingly, in addition to the alignments caused by the banks 33 and 43, the liquid crystal molecules 30 are also aligned by the ultra violet ray, as shown in FIG. 24. As a result, the disclination is effectively suppressed by the combination of the bank alignment which uses the banks to align the liquid crystal molecules, and the optical alignment which optically aligns the liquid crystal molecules by the ultra violet ray.

In this embodiment, the homeotropic alignment layer is made of a polyimide homeotropic alignment layer JALS-204 manufactured by Nihon Gosei Gomu of Japan, and the liquid crystals are made of negative type liquid crystals MLC-6608 manufactured by Merk. The banks 33 and 43 are made of a photosensitive resist manufactured by Nihon Gosei Rubber of Japan, particularly a resist called planarization agent. The photosensitive resist can change the shape which is patterned depending on the intensity of the irradiated light, baking temperature, composition and the like. Hence, the banks 33 and 43 can be shaped to have an approximate semi-circular cross section by selecting appropriate baking conditions. In this embodiment, the heights of the banks 33 and 43 are set in a range of 0.5 $\mu$m to 5 $\mu$m, and the widths of the banks 33 and 43 are set in a range of 2 $\mu$m to 10 $\mu$m.

According to experiments conducted by the present inventors, setting the heights of the banks 33 and 43 greater than or equal to 5 $\mu$m is an undesirable condition because the cell thickness is affected thereby or the injection of the liquid crystals is interfered thereby. Furthermore, it was also confirmed that the restricting capability of the bank alignment deteriorates when the widths of the banks 33 and 43 are set less than or equal to 2 $\mu$m.

For example, the banks 33 and 43 can be formed by spin-coating a resin on the corresponding glass substrates 31 and 41, and thereafter carrying out a photolithography process. Further, the banks 33 and 43 can be shaped to have an approximate semi-circular cross section by carrying out a curing process at 180° C., for example. That is, the banks 33 and 43 have an approximate half-cylinder shape which is obtained by cutting a cylinder along an axial direction.

The ultra violet ray used in this embodiment is a light including an ultra violet ray having a wavelength in a vicinity of 250 nm. This ultra violet ray is irradiated obliquely with respect to the surface of the glass substrate 41 or 31, at an angle in a range of 10 degrees to 45 degrees. The intensity of the ultra violet ray is approximately 29 mW/cm$^2$ when the ultra violet ray is irradiated on the glass substrate 41 or 31 in front. It was possible to obtain a most satisfactory alignment by irradiating the ultra violet ray for 60 seconds at an angle of 45 degrees, with respect to the polyimide alignment layer used in this embodiment. A pre-tilt angle of the liquid crystals is set greater than or equal to 80 degrees and less than or equal to 90 degrees, where the pre-tilt angle refers to an angle formed by a major axis of the liquid crystal molecule and the substrate. It was found that satisfactory contrast and alignment are obtained particularly when the pre-tilt angle is set in a range of 85 degrees to 88 degrees.

Figure 25:
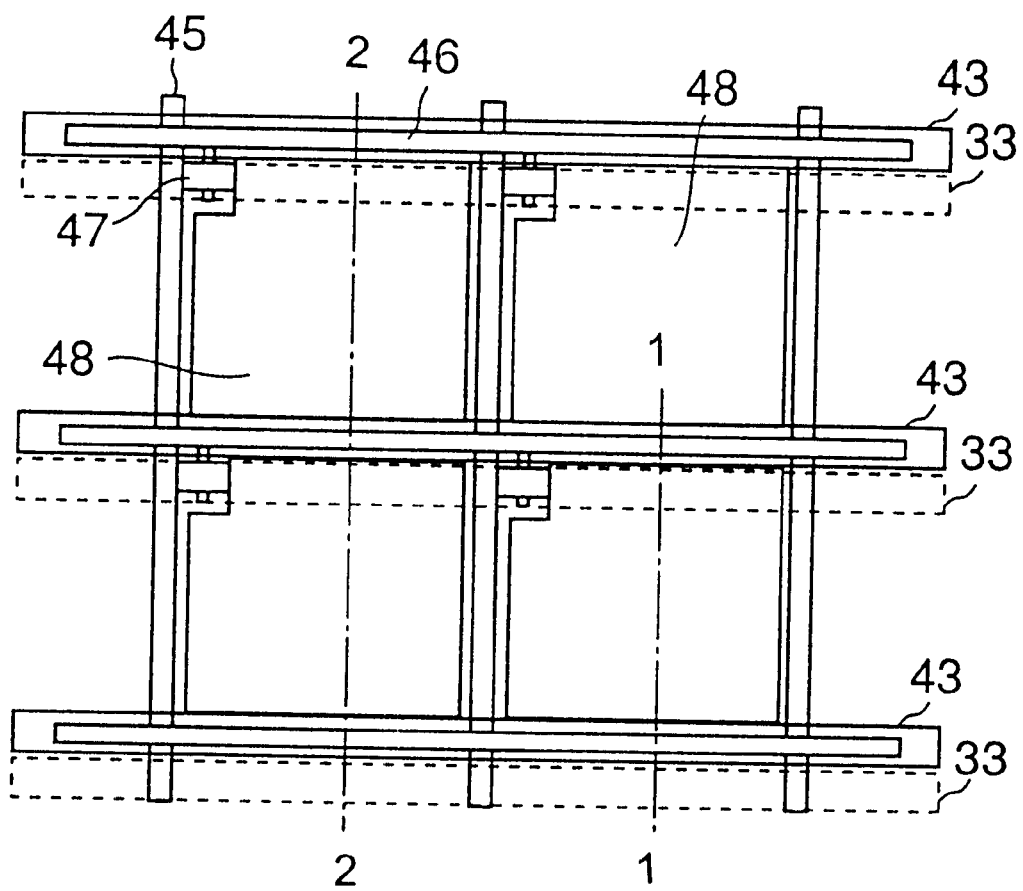
FIG. 25 is a plan view showing an important part of the tenth embodiment.

In this embodiment, the banks 33 and 43 are arranged as shown in FIG. 25. If it is assumed for the sake of convenience that the TFT glass substrate 41 is located on the rear side of the paper in FIG. 25 and the opposing glass substrate 31 is located on the front side of the paper in FIG. 25, the liquid crystal molecules 30 become aligned from the vertical state to a state inclined in an upward direction of the paper in FIG. 25 by applying a driving voltage across the transparent electrodes 32 and 42. At the same time, the ultra violet ray is irradiated on the glass substrates 31 and 41 to carry out the optical alignment, in addition to the applying of the driving voltage, so that the liquid crystal molecules 30 become aligned from the vertical state to the state inclined in the upward direction of the paper in FIG. 25.

Figure 26:
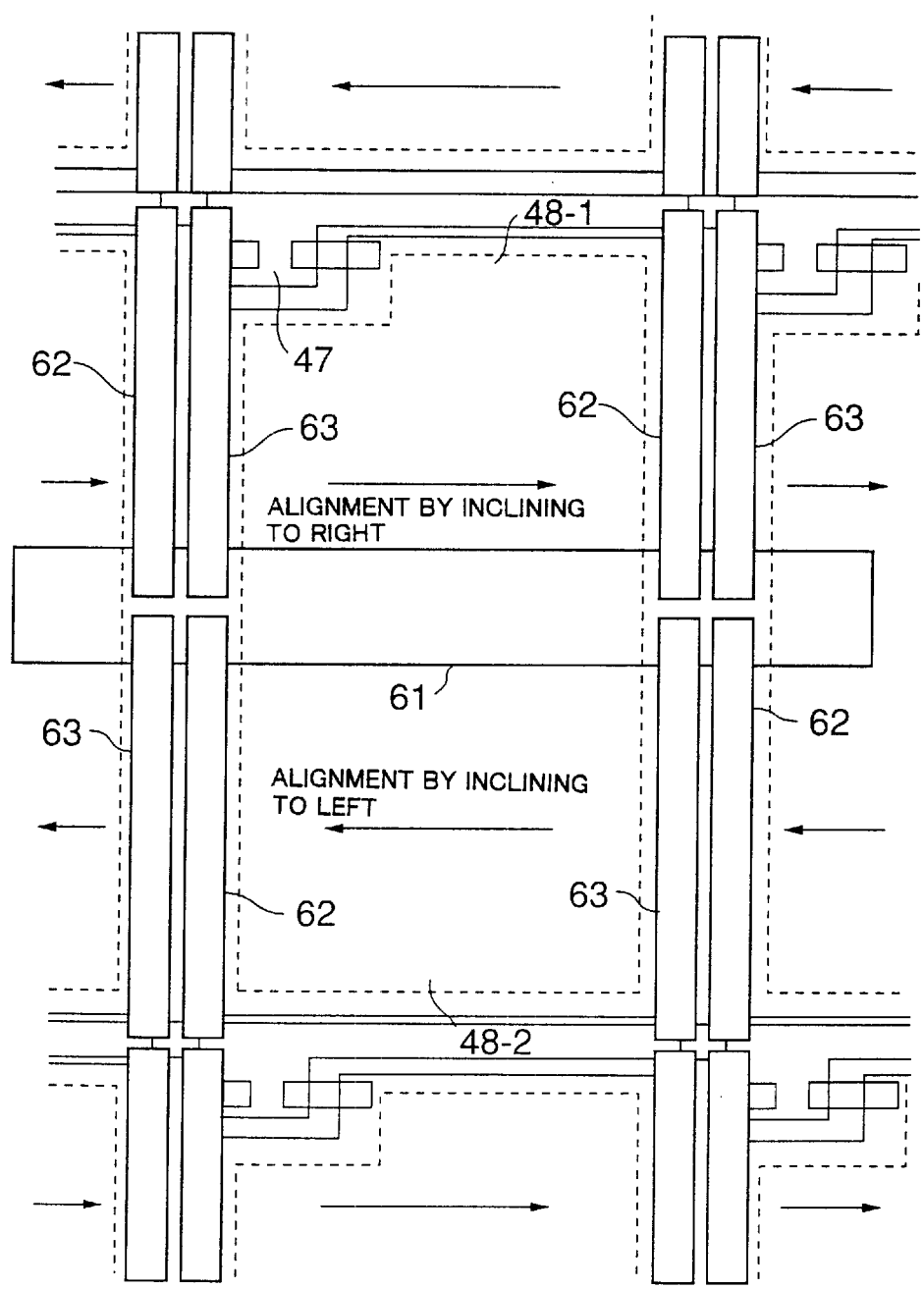
FIG. 26 is a plan view showing an important part of an eleventh embodiment of the liquid crystal display device according to the present invention.

FIG. 26 is a plan view showing an important part of an eleventh embodiment of the liquid crystal display device according to the present invention. In the tenth embodiment described above, for example, the pixel region has a generally square shape and mono-domain is a precondition. But in this eleventh embodiment, the pixel region has an oblong shape which is longer in the vertical direction, and this oblong pixel region is divided into 2 sections as shown in FIG. 26. In FIG. 26, those parts which are the same as those corresponding parts in FIGS. 3 through 5 are designated by the same reference numerals, and a description thereof will be omitted.

In this embodiment, a subsidiary capacitance electrode 61 is formed on the TFT glass substrate 41 in parallel with the gate bus line 46. As shown in FIG. 26, the pixel region is divided into a pair of pixel region parts 48-1 and 48-2.

In addition, a bank 62 is formed on the opposing glass substrate 31 on the right side of the pixel region part 48-1, and a bank 63 is formed on the TFT glass substrate 41 on the right side of this bank 62. Another bank 63 is formed on the TFT glass substrate 41 on the left side of the pixel region part 48-1, and another bank 62 is formed on the opposing glass substrate 31 on the left side of this other bank 63. On the other hand, a bank 62 is formed on the opposing glass substrate 31 on the left side of the pixel region part 48-2, and a bank 63 is formed on the TFT glass substrate 41 on the left side of this bank 62. Furthermore, another bank 63 is formed on the TFT glass substrate 41 on the right side of the pixel region part 48-2, and another bank 62 is formed on the opposing glass substrate 31 on the right side of this other bank 63.

By providing the banks 62 and 63 in parallel with the data bus lines 45, the liquid crystal molecules 30 within the pixel region part 48-1 are aligned by inclining to the right as indicated by an arrow in FIG. 26, and the liquid crystal molecules 30 within the pixel region part 48-2 are aligned by inclining to the left as indicated by an arrow in FIG. 26, by the bank alignment. Furthermore, by irradiating the ultra violet ray via an optical mask, the ultra violet ray is irradiated in opposite directions between the pixel region part 48-1 and the pixel region part 48-2.

In other words, the tenth embodiment described above is applied to the alignment division of this eleventh embodiment.

Next, a description will be given of a twelfth embodiment of the liquid crystal display device according to the present invention, by referring to FIGS. 27 through 29. This embodiment also combines the bank alignment and the optical alignment.

Figure 27:
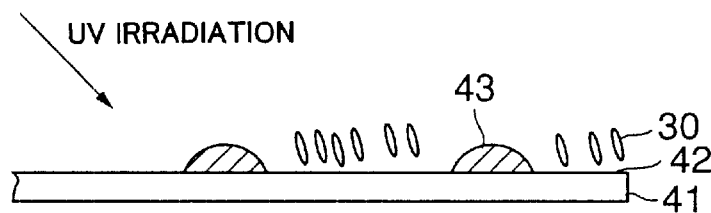
FIG. 27 is a cross sectional view for explaining a process of irradiating an ultra violet ray with respect to a substrate having a bank in a twelfth embodiment of the liquid crystal display device according to the present invention.
Figure 28:
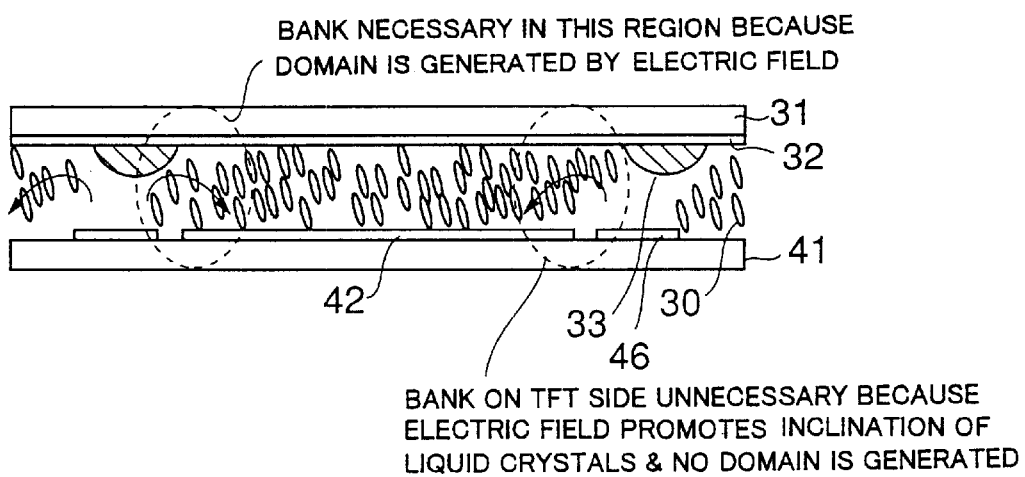
FIG. 28 is a cross sectional view showing an important part of the twelfth embodiment.
Figure 29:
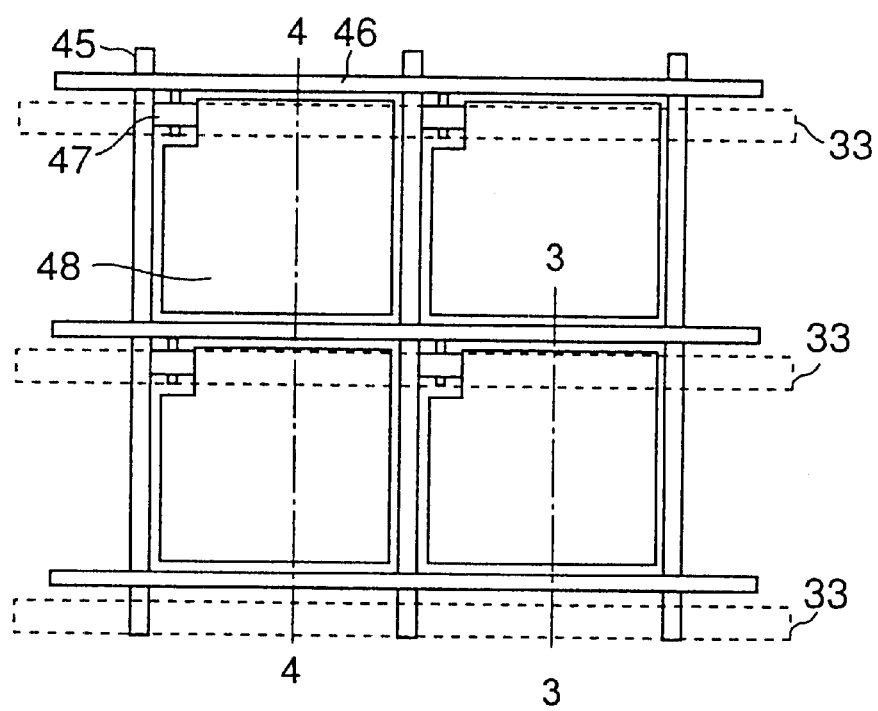
FIG. 29 is a plan view showing an important part of the twelfth embodiment.

FIG. 27 is a cross sectional view for explaining a process of irradiating an ultra violet ray with respect to a substrate having banks, and FIG. 28 is a cross sectional view showing an important part of this embodiment. In addition, FIG. 29 is a plan view showing an important part of this embodiment. FIG. 27 is a cross sectional view along a line E-F in FIG. 29, and FIG. 28 is a cross sectional view along a line G-H in FIG. 29. In FIGS. 27 through 29, those parts which are the same as those corresponding parts in FIGS. 23 through 25 are designated by the same reference numerals, and a description thereof will be omitted.

In this embodiment, the banks 43 which are provided on the TFT glass substrate 41 in the tenth embodiment described above are omitted. In regions surrounded by dotted lines in FIG. 28, the electric field promotes the inclination of the liquid crystal molecules 30. Hence, even if the banks 43 are omitted as in this embodiment, the disclination can still be suppressed.

Figure 30:
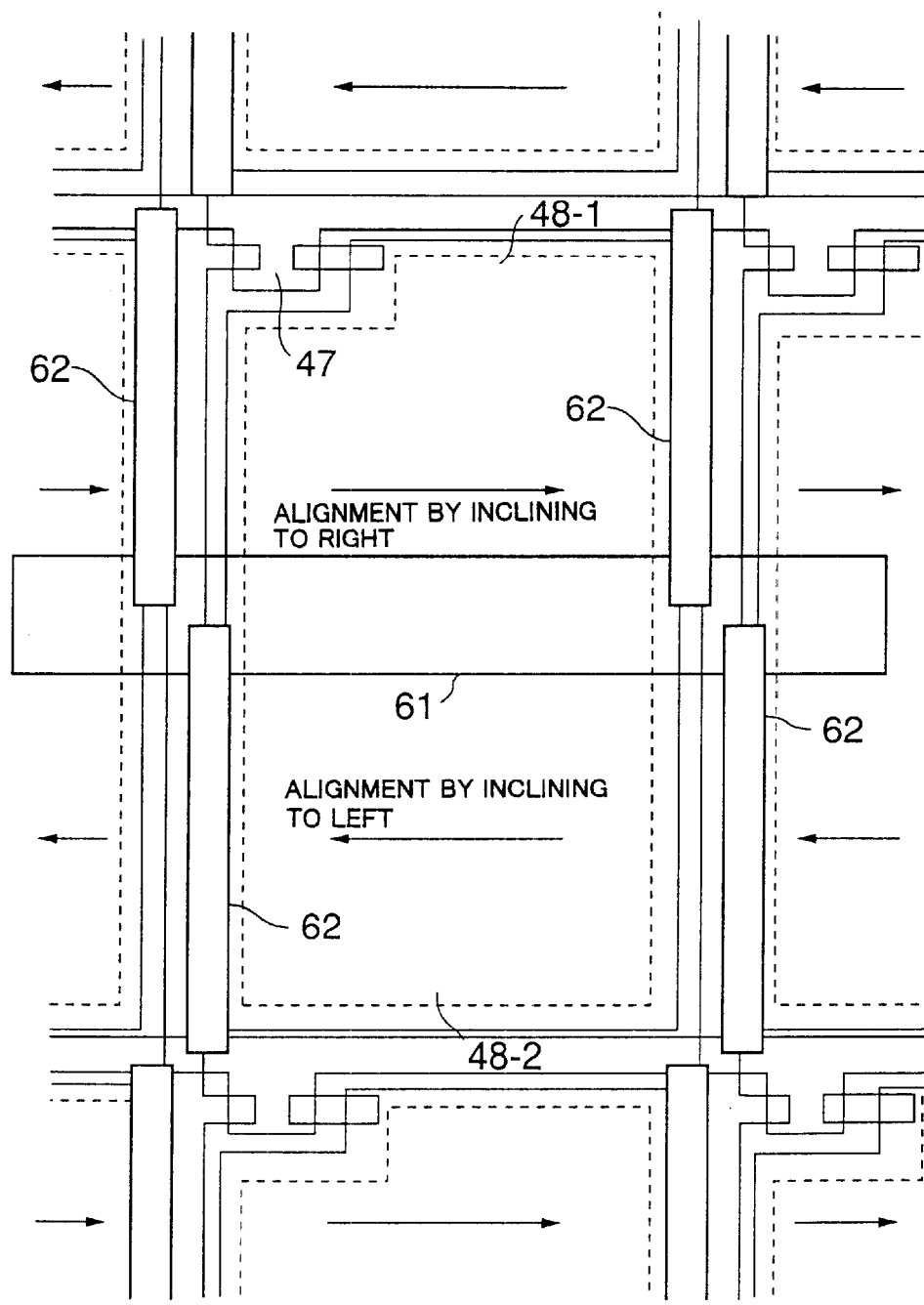
FIG. 30 is a plan view showing an important part of a thirteenth embodiment of the liquid crystal display device according to the present invention.

FIG. 30 is a plan view showing an important part of a thirteenth embodiment of the liquid crystal display device according to the present invention. In this embodiment, the pixel region has an oblong shape, and is divided into two sections as shown in FIG. 30. In FIG. 30, those parts which are the same as those corresponding parts in FIGS. 27 through 29 are designated by the same reference numerals, and a description thereof will be omitted.

In other words, the twelfth embodiment described above is applied to the alignment division of this thirteenth embodiment.

Figure 31:
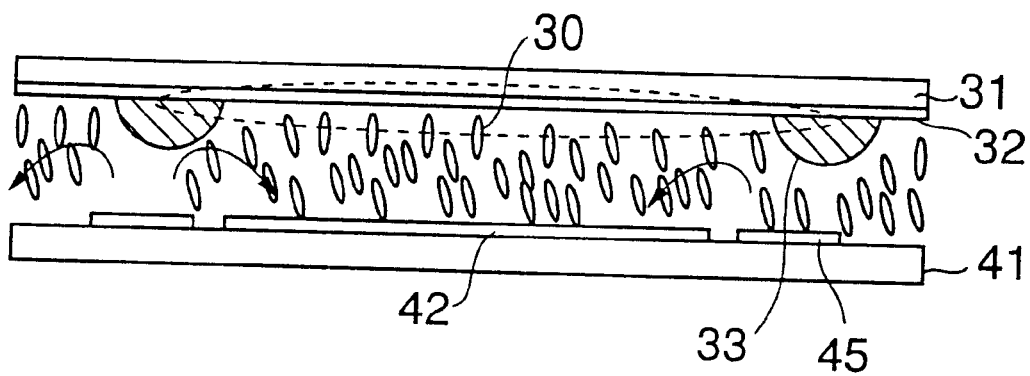
FIG. 31 is a cross sectional view showing an important part of a fourteenth embodiment of the liquid crystal display device according to the present invention.

Next, a description will be given of a fourteenth embodiment of the liquid crystal display device according to the present invention, by referring to FIG. 31. FIG. 31 is a cross sectional view showing an important part of this embodiment. In FIG. 31, those parts which are the same as those corresponding parts in FIGS. 27 through 29 are designated by the same reference numerals, and a description thereof will be omitted.

In this embodiment, the optical alignment is carried out only with respect to the TFT glass substrate 41, and combines three kinds of alignments, namely, the optical alignment, the bank alignment, and the alignment which uses the horizontal electrical field as in the eleventh embodiment described above. Even if the optical alignment with respect to one of the glass substrates is omitted, it is still possible to effectively suppress the disclination.

Figure 32:
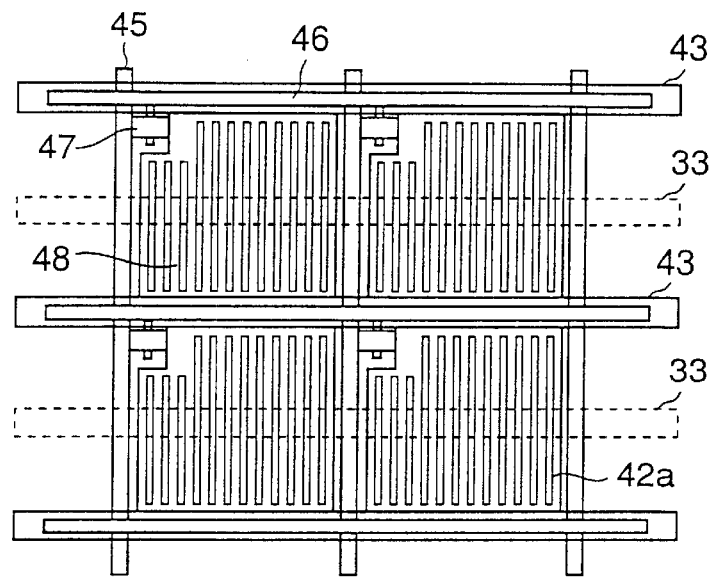
FIG. 32 is a plan view showing an important part of a fifteenth embodiment of the liquid crystal display device according to the present invention.

Next, a description will be given of a fifteenth embodiment of the liquid crystal display device according to the present invention, by referring to FIG. 32. FIG. 32 is a plan view showing an important part of this embodiment. In FIG. 32, those parts which are the same as those corresponding parts in FIG. 24 are designated by the same reference numerals, and a description thereof will be omitted.

In this embodiment, slits 42a are formed in the transparent electrode 42 on the TFT glass substrate 41. Each slit 42a extends in a direction in which the liquid crystal molecules 30 are to be inclined, that is, in a direction perpendicular to the banks 33 and 43. In a case where the interval of the slits 42a is narrow, there is a tendency for the vertically aligned liquid crystal molecules 30 to incline in a direction parallel to the slits 42a when a driving voltage is applied across the transparent electrodes 32 and 42. Hence, in addition to the bank alignment provided by the banks 33 and 43, a slit alignment is provided by the slits 42a, thereby making it possible to further suppress the disclination.

The slits 42a can be formed by arranging a pattern of the slits 42a on a photo-mask which is used when forming the transparent electrode 42 on the TFT glass substrate 41. In other words, the transparent electrode 42 is normally patterned depending on the size of each pixel region 48, but in this embodiment, the slits 42a are formed simultaneously during this patterning process. Other part of this embodiment can be formed similarly as in the case of the tenth embodiment described above.

According to the experiments conducted by the present inventors, it was confirmed that the slit alignment becomes effective when the width of the slit 42a is in a range of 1 $\mu$m to 10 $\mu$m, and the pitch of the slits 42a is in a range of 1.5 times to 5 times the width of the slit 42a. In addition, it was confirmed that the slit alignment is particularly effective when the pitch of the slits 42a is set in a range of 1.5 $\mu$m to 20 $\mu$m. Furthermore, the width of the slit 42a was desirably 5 $\mu$m, and the pitch of the slits 42a was desirably 10 $\mu$m. It was also confirmed that the slit alignment provided by the slits 42a is particularly satisfactory when the width of the slit 42a and the distance between two mutually adjacent slits 42a are the same.

Figure 33:
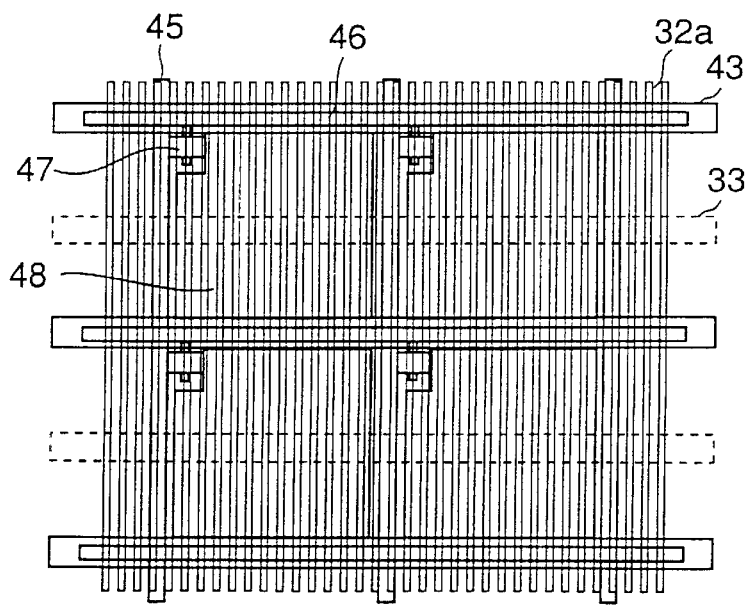
FIG. 33 is a plan view showing an important part of a sixteenth embodiment of the liquid crystal display device according to the present invention.

Next, a description will be given of a sixteenth embodiment of the liquid crystal display device according to the present invention, by referring to FIG. 33. FIG. 33 is a plan view showing an important part of this embodiment. In FIG. 33 those parts which are the same as those corresponding parts in FIG. 25 are designated by the same reference numerals, and a description thereof will be omitted.

In this embodiment, slits 32a are formed in the transparent electrode 32 on the opposing glass substrate 31. Each slit 32a extends in a direction in which the liquid crystal molecules 30 are to be inclined, that is, in a direction perpendicular to the banks 33 and 43. In a case where the interval of the slits 32a is narrow, there is a tendency for the vertically aligned liquid crystal molecules 30 to incline in a direction parallel to the slits 32a when a driving voltage is applied across the transparent electrodes 32 and 42. Hence, in addition to the bank alignment provided by the banks 33 and 43, a slit alignment is provided by the slits 32a, thereby making it possible to further suppress the disclination. The effects of the slits 32a are essentially the same as the effects of the slits 42a described above.

In the fifteenth embodiment, the slits 42a are formed in the transparent electrode 42 on the TFT glass substrate 41. For this reason, the slits 42a cannot be formed at end portions of the pixel regions 48 because of the need to make electrical connections. On the other hand, the slits 32a of this embodiment are formed in the transparent electrode 32 on the opposing glass substrate 31. For this reason, although an independent photolithography process of forming the slits 32a becomes additionally necessary, the slits 32a can be formed to cover the entire pixel region 48. Consequently, the slit alignment provided by the slits 32a is stronger than that of the fifteenth embodiment, and the effect of suppressing the disclination is further improved according to this embodiment.

Figure 34:
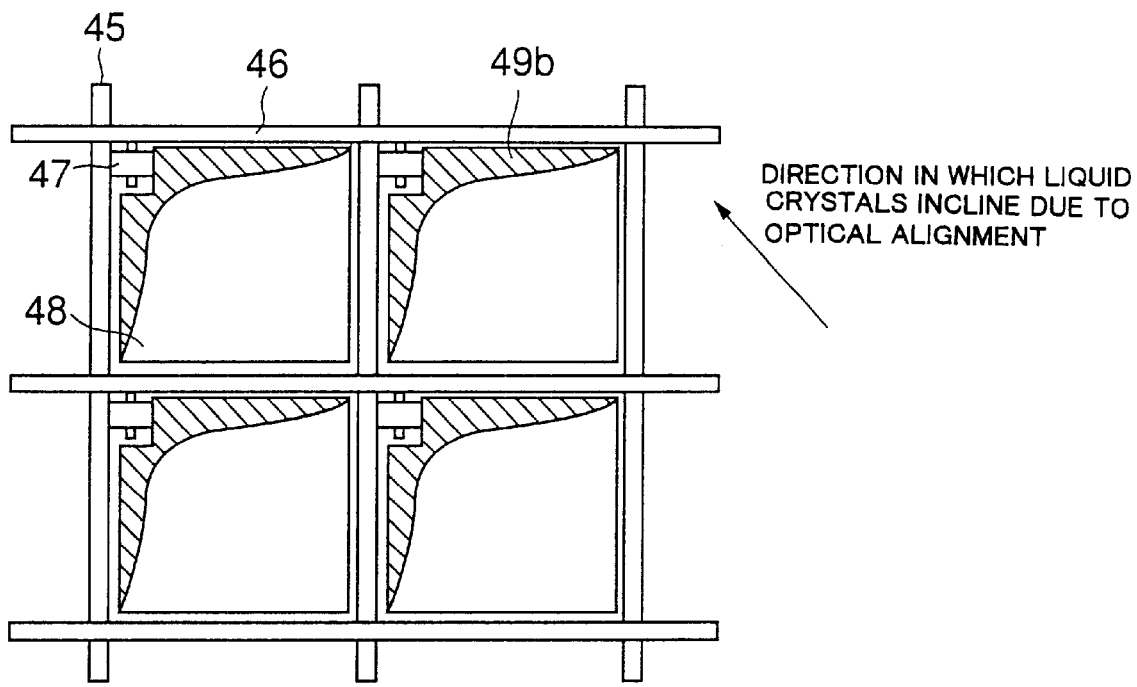
FIG. 34 is a plan view for explaining the disclination which is generated when a light alignment is made in a 45° direction.

According to the experiments conducted by the present inventors, it was found that disclinations 49b shown in FIG. 34 are generated when the optical alignment is made at an angle of 45 degrees to the substrate. In FIG. 34, those parts which are the same as those corresponding parts in FIG. 6 are designated by the same reference numerals, and a description thereof will be omitted. Because the direction in which the liquid crystal molecules 30 are inclined and the direction of the horizontal electric field have a 45 degree difference, the disclination 49b causes the direction of inclination direction of the liquid crystal molecules 30 to change continuously. Therefore, in seventeenth and eighteenth embodiments of the liquid crystal display device according to the present invention which will be described hereunder, the optical alignment and the slit alignment of the fifteenth and sixteenth embodiments described above are combined.

Figure 35:
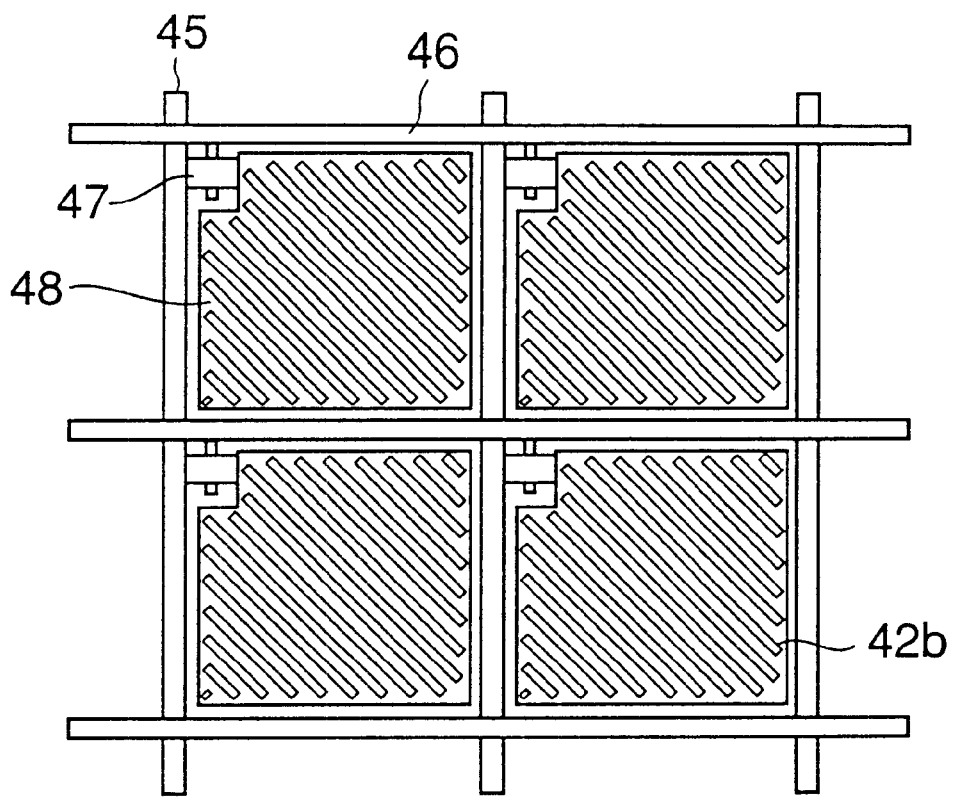
FIG. 35 is a plan view showing an important part of a seventeenth embodiment of the liquid crystal display device according to the present invention.

FIG. 35 is a plan view showing an important part of the seventeenth embodiment of the liquid crystal display device according to the present invention. In FIG. 35, those parts which are the same as those corresponding parts in FIG. 32 are designated by the same reference numerals, and a description thereof will be omitted.

The ultra violet ray used in this embodiment is a light including an ultra violet ray having a wavelength in a vicinity of 250 nm. This ultra violet ray is irradiated obliquely with respect to the surface of the glass substrate 41, at an angle in a range of 10 degrees to 45 degrees. The intensity of the ultra violet ray is approximately 29 mW/cm$^2$ when the ultra violet ray is irradiated on the glass substrate 41 in front. It was possible to obtain a most satisfactory alignment by irradiating the ultra violet ray for 60 seconds at an angle of 45 degrees, with respect to the polyimide alignment layer used in this embodiment. The pre-tilt angle of the liquid crystals is set greater than or equal to 80 degrees and less than or equal to 90 degrees. It was found that satisfactory contrast and alignment are obtained particularly when the pre-tilt angle is set in a range of 85 degrees to 88 degrees.

On the other hand, slits 42b are formed in the transparent electrode 42 on the TFT glass substrate 41. Each slit 42b extends in a direction in which the liquid crystal molecules 30 are to be inclined, that is, in a direction inclined by 30 degrees or more with respect to the data bus lines 45. In this embodiment, the slits 42b are inclined by 45 degrees with respect to the data bus lines 45. In a case where the interval of the slits 42b is narrow, there is a tendency for the vertically aligned liquid crystal molecules 30 to incline in a direction parallel to the slits 42b when a driving voltage is applied across the transparent electrodes 32 and 42. Hence, in addition to the optical alignment, the slit alignment is provided by the slits 42b, thereby making it possible to effectively suppress the disclination.

The conditions of the slits 42b, such as the method of forming the slits 42b and the dimensions of the slits 42b, may be set similarly to the fifteenth embodiment described above.

Figure 36:
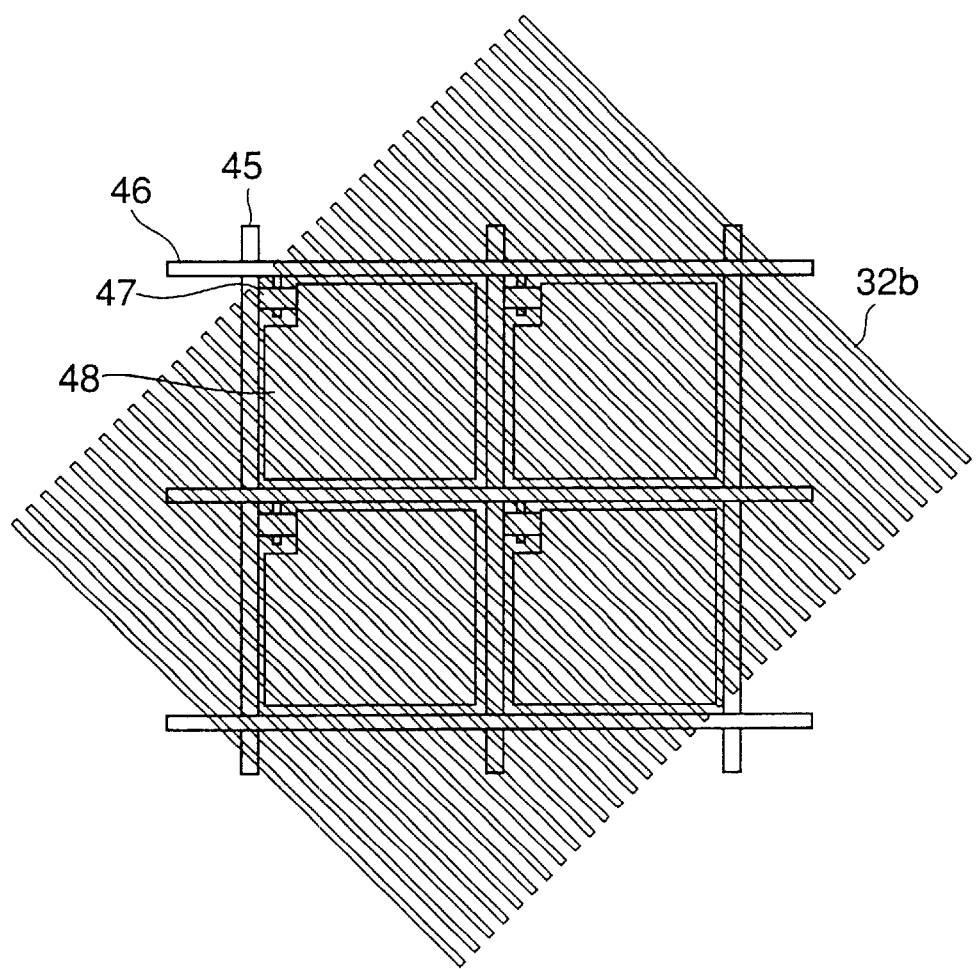
FIG. 36 is a plan view showing an important part of an eighteenth embodiment of the liquid crystal display device according to the present invention.

FIG. 36 is a plan view showing an important part of the eighteenth embodiment of the liquid crystal display device according to the present invention. In FIG. 36, those parts which are the same as those corresponding parts in FIG. 33 are designated by the same reference numerals, and a description thereof will be omitted.

In this embodiment, slits 32b are formed in the transparent electrode 32 on the opposing glass substrate 31, in addition to the optical alignment similar to that of the seventeenth embodiment described above. Each slit 32b extends in a direction in which the liquid crystal molecules 30 are to be inclined, that is, in a direction inclined by 30 degrees or more with respect to the data bus lines 45. In this embodiment, the slits 32b are inclined by 45 degrees with respect to the data bus lines 45. In a case where the interval of the slits 32b is narrow, there is a tendency for the vertically aligned liquid crystal molecules 30 to incline in a direction parallel to the slits 32b when a driving voltage is applied across the transparent electrodes 32 and 42. Hence, in addition to the optical alignment, the slit alignment is provided by the slits 32b, thereby making it possible to effectively suppress the disclination. The effects of the slits 32b are essentially the same as the effects of the slits 42b described above.

Figure 37:
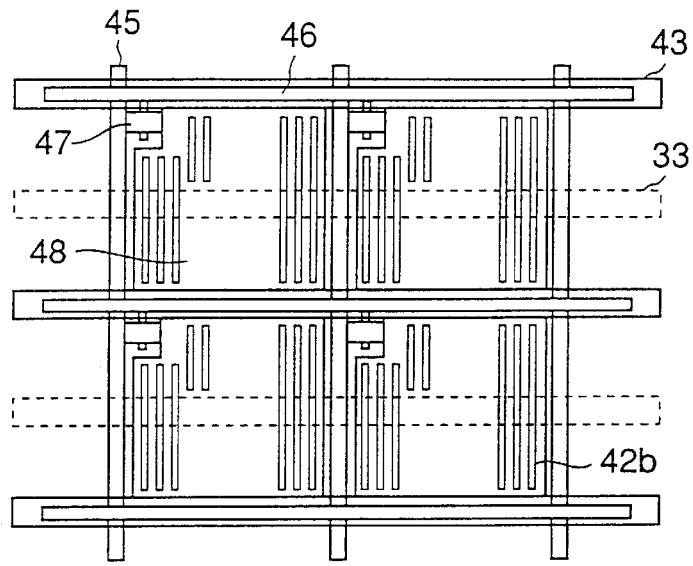
FIG. 37 is a plan view showing an important part of a nineteenth embodiment of the liquid crystal display device according to the present invention.

Next, a description will be given of a nineteenth embodiment of the liquid crystal display device according to the present invention, by referring to FIG. 37. FIG. 37 is a plan view showing an important part of this embodiment. In FIG. 37, those parts which are the same as those corresponding parts in FIG. 32 are designated by the same reference numerals, and a description thereof will be omitted.

In this embodiment, the slits 42a are provided in the transparent electrode 42 at locations only in the vicinities of the data bus lines 45. The present inventors confirmed through experiments that it is possible to satisfactorily suppress the effects of the horizontal electric field, even when the slits 42a are provided only in the vicinities of the data bus lines 45.

Figure 38:
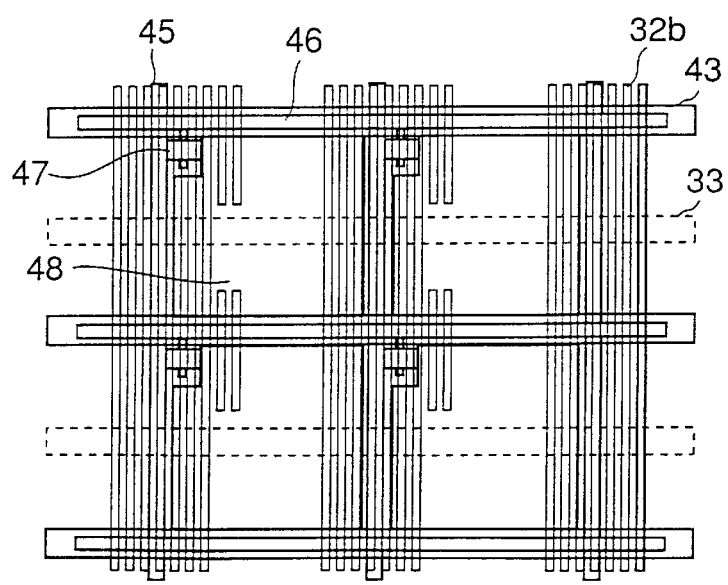
FIG. 38 is a plan view showing an important part of a twentieth embodiment of the liquid crystal display device according to the present invention.

Next, a description will be given of a twentieth embodiment of the liquid crystal display device according to the present invention, by referring to FIG. 38. FIG. 38 is a plan view showing an important part of this embodiment. In FIG. 38, those parts which are the same as those corresponding parts in FIG. 33 are designated by the same reference numerals, and a description thereof will be omitted.

In this embodiment, the slits 32a are provided in the transparent electrode 32 at locations only in the vicinities of the data bus lines 45. The present inventors confirmed through experiments that it is possible to satisfactorily suppress the effects of the horizontal electric field, even when the slits 32a are provided only in the vicinities of the data bus lines 45.

Of course, it is possible to apply the nineteenth embodiment to the seventeenth embodiment described above, and to apply the twentieth embodiment to the eighteenth embodiment described above.

Figure 39:
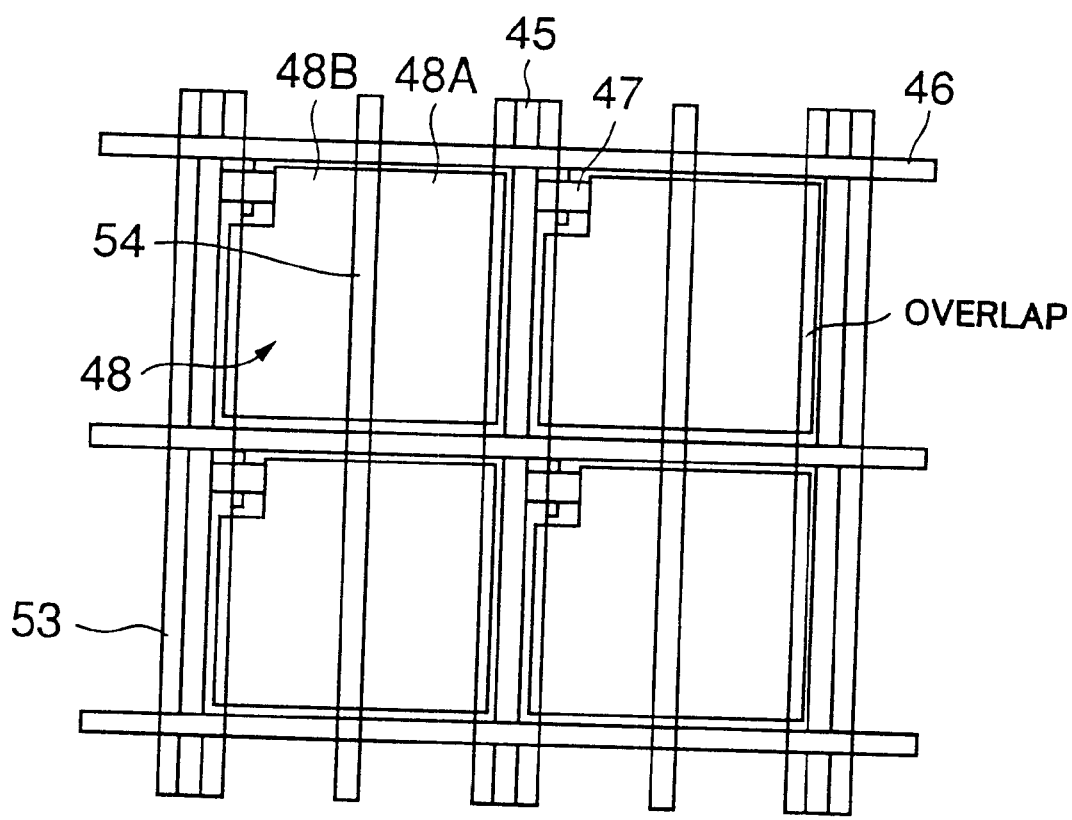
FIG. 39 is a plan view showing an important part of a twenty-first embodiment of the liquid crystal display device according to the present invention.

Next, a description will be given of a twenty-first embodiment of the liquid crystal display device according to the present invention, by referring to FIG. 39. FIG. 39 is a plan view showing an important part of this embodiment. In FIG. 39, those parts which are the same as those corresponding parts in FIGS. 3 through 8 are designated by the same reference numerals, and a description thereof will be omitted.

When considering the aperture ratio of each pixle and the symmetry of the liquid crystal panel projection type display unit (projector), it is desirable to provide the banks parallel to the data bus lines 45 or, to provide the banks parallel to the gate bus lines 46. However, when the tilt angle from the light source is taken into consideration, if the banks are provided in parallel to the gate bus lines 46 and the driving voltage is applied across the transparent electrodes 32 and 42, there is a possibility of generating an alignment region in which the liquid crystal molecules 30 become inclined by an angle approximately parallel to the incident angle of the light from the light source. In such an alignment region, there is a possibility of generating a deterioration of the white luminance or a gradation reversal of black display (gray scale). Accordingly, this embodiment provides banks 53 and 54 in parallel to the data bus lines 45, as shown in FIG. 39.

The banks 53 are provided on the side of the TFT glass substrate 41, while the banks 54 are provided on the side of the opposing glass substrate 31. The banks 53 are arranged to overlap the data bus lines 45 and to partially overlap the peripheral parts of the pixel regions 48, that is, the peripheral parts of the transparent electrode 42 corresponding to the pixel region 48. On the other hand, the banks 54 are arranged to pass approximately the centers of the pixel regions 48. The width of the banks 53 is set greater than the width of the banks 54. By using such an arrangement of the banks 53 and 54, the alignment direction becomes opposite to each other between a part 48A on the right side of the bank 54 and a part 48B on the left side of the bank 54, within each pixel region 48. Accordingly, by setting the alignment direction in a direction which makes the viewing angle characteristics of the liquid crystal panel satisfactory in the up and down direction of the pixel region 48, that is, in a direction which differs by 90 degrees with respect to the direction in which the liquid crystal molecules 30 are inclined, it becomes possible to obtain a satisfactory display picture on the liquid crystal panel projection type display unit.

The banks 53 partially overlap the peripheral parts of the pixel regions 48 in order to suppress the effects of the electric field caused by the transparent electrode 42 corresponding to the pixel regions 48.

For example, the width of the banks 53 is 15 μm, and the height of the banks 53 is 1 μm. On the other hand, the width of the banks 54 is 5 μm, and the height of the banks 54 is 1 μm.

Of course, it is possible to provide the banks 54 on the side of the TFT glass substrate 41, and to provide the banks 53 on the side of the opposing glass substrate 31.

Figure 40:
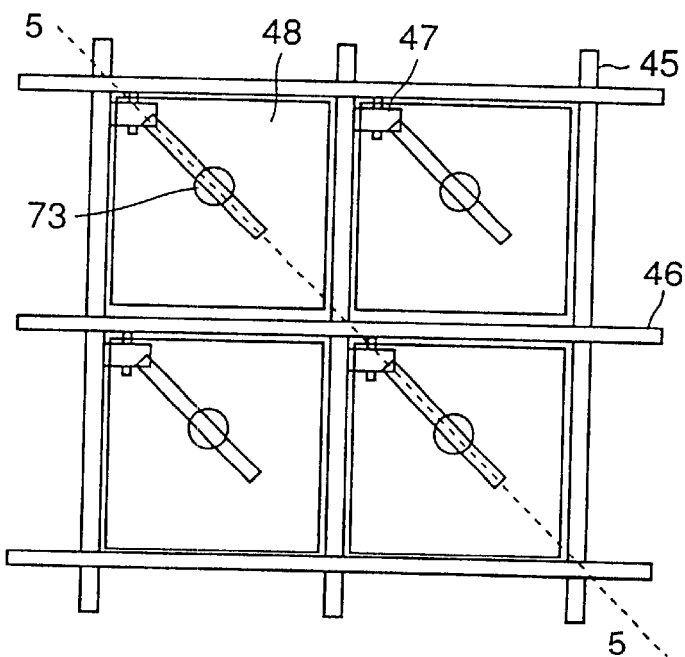
FIG. 40 is a plan view showing an important part of a twenty-second embodiment of the liquid crystal display device according to the present invention.
Figure 41:
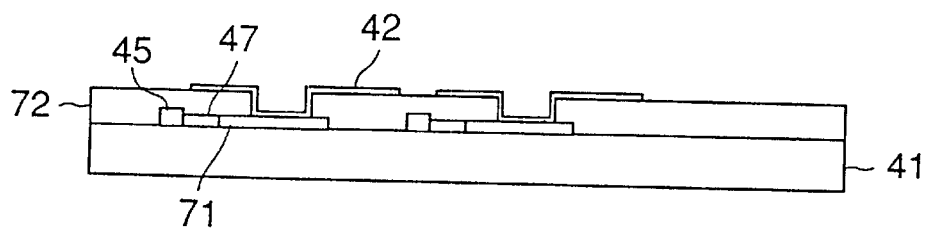
FIG. 41 is a cross sectional view showing an important part of the twenty-second embodiment.

Next, a description will be given of a twenty-second embodiment of the liquid crystal display device according to the present invention, by referring to FIGS. 40 and 41. FIG. 40 is a plan view showing an important part of this embodiment, and FIG. 41 is a cross sectional view along a line E-F in FIG. 40. In FIGS. 40 and 41, those parts which are the same as those corresponding parts in FIGS. 3 through 5 are designated by the same reference numerals, and a description thereof will be omitted.

In this embodiment, the data bus lines 45, the TFTs 47 and contact electrodes 71 are provided on the TFT glass substrate 41, and a planarization layer 72 made of a resin is formed on top of these elements as shown in FIG. 41. As shown in FIG. 40, contact holes 73 are formed in the planarization layer 72. The transparent electrode 42 connects for example to a drain of the TFT 47 via the contact hole 73 and the contact electrode 71. The vignetting factor is improved by employing this construction.

Figure 42:
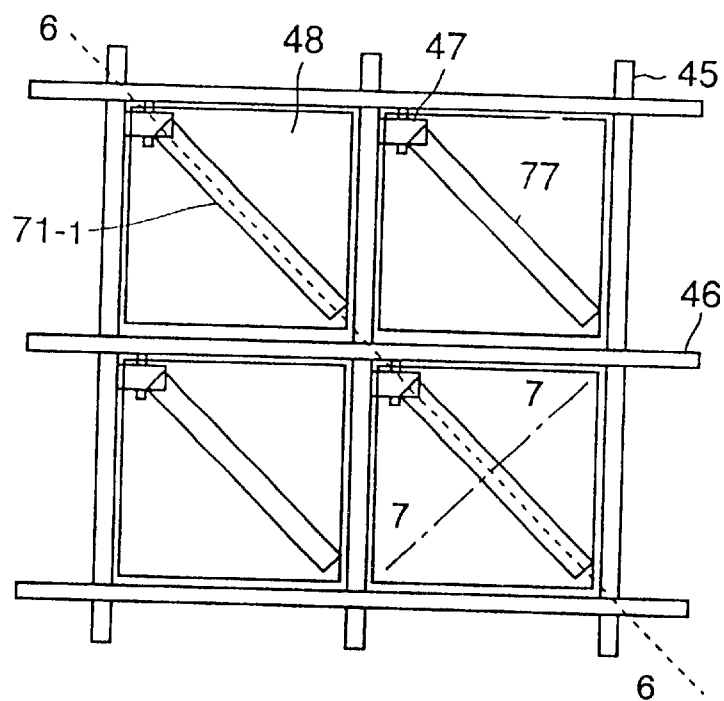
FIG. 42 is a plan view showing an important part of a twenty-third embodiment of the liquid crystal display device according to the present invention.
Figure 43:
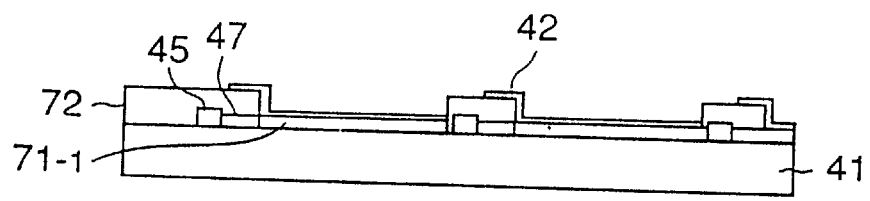
FIG. 43 is a cross sectional view showing an important part of the twenty-third embodiment.
Figure 44:
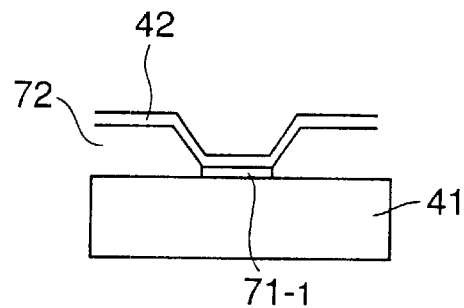
FIG. 44 is a cross sectional view showing an important part of the twenty-third embodiment.

Next, a description will be given of a twenty-third embodiment of the liquid crystal display device according to the present invention, by referring to FIGS. 42 through 44. FIG. 42 is a plan view showing an important part of this embodiment. FIG. 43 is a cross sectional view along a line G-H in FIG. 42. FIG. 44 is a cross sectional view along a line I-J in FIG. 42. In FIGS. 42 through 44, those parts which are the same as those corresponding parts in FIGS. 40 and 41 are designated by the same reference numerals, and a description thereof will be omitted.

In this embodiment, the contact holes 73 are omitted, and contact electrodes 71-1 are provided to function both as the contact electrodes 71 and the contact holes 73, as shown in FIGS. 42 and 43. The contact electrode 71-1 is arranged approximately along a diagonal line with respect to each pixel region 48. In addition, a groove 77 is formed in the planarization layer 72 at the upper part of the contact electrode 71-1, and the groove 77 has a tapered cross section as shown in FIG. 44. The transparent electrode 42 is formed on the planarization layer 72, including this groove 77, so as to realize the function of restricting the alignment direction.

Figure 45:
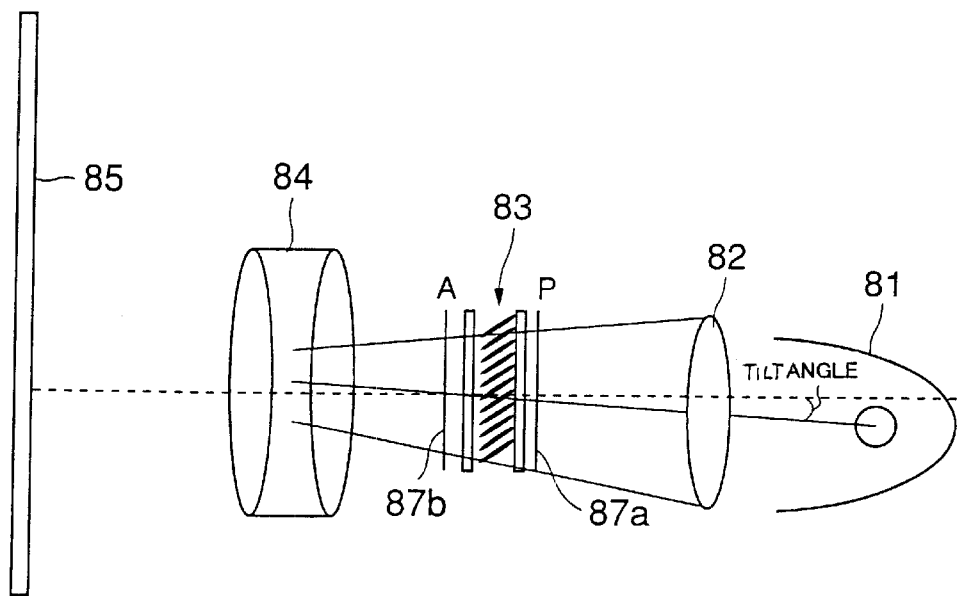
FIG. 45 is a diagram showing an important part of a twenty-fourth embodiment of the liquid crystal display device according to the present invention.

Next, a description will be given of a twenty-fourth embodiment of the liquid crystal display device according to the present invention, by referring to FIG. 45. FIG. 45 is a diagram showing an important part of this embodiment. More particularly, FIG. 45 shows the general construction of a projection type liquid crystal display unit employing the VA type LCD device, that is, the liquid crystal panel projection type display unit (projector).

In FIG. 45, the liquid crystal panel projection type display unit generally includes a light source 81, a condenser lens 82, a liquid crystal panel 83, a projection lens 84, and a screen 85. Polarizing plates 87a and 87b may be a part of the liquid crystal panel 83 or be independent of the liquid crystal panel 83. The polarizing plate 87a has an absorption axis in a direction perpendicular to the paper in FIG. 45, and the polarizing plate 87b has an absorption axis in a direction parallel to the paper in FIG. 45, that is, in an up and down direction in FIG. 45.

For example, the light source 81 is made up of a 120 W metal hallide lamp having an arc length of 1.2 mm. The liquid crystal panel 83 has a construction according to any of the first through twenty-third embodiments described above, and the cell thickness is 4 μm, for example. The light from the light source 81 passes through the condenser lens 82 with a predetermined tilt angle and reaches the liquid crystal panel 83. The liquid crystal panel 83 projects the light which is converged by the condenser lens 82 onto the screen 85 via the projection lens 84, and an image on the liquid crystal panel 83 is displayed on the screen 85. According to this embodiment, it is possible to make a picture display having a high contrast.

Figure 46:
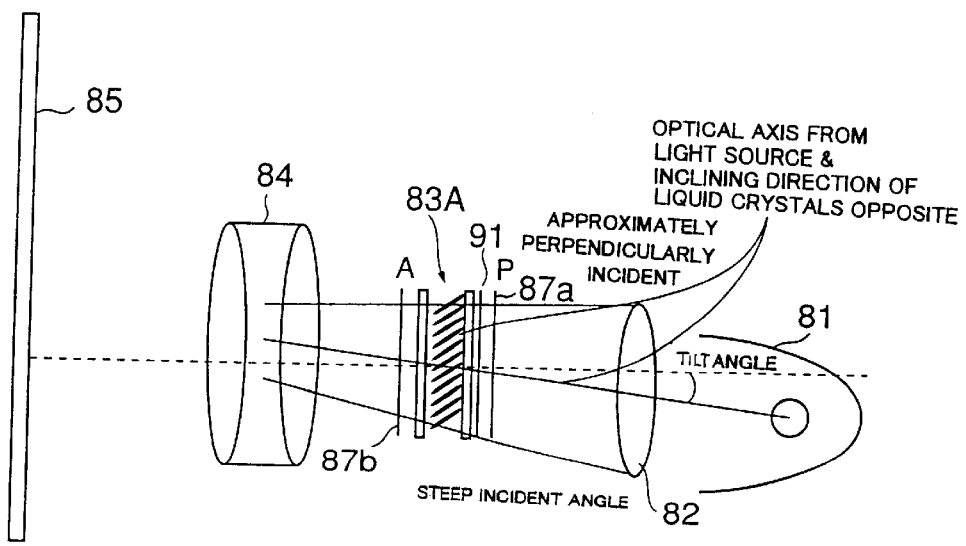
FIG. 46 is a diagram showing an important part of a twenty-fifth embodiment of the liquid crystal display device according to the present invention.

Next, a description will be given of a twenty-fifth embodiment of the liquid crystal display device according to the present invention, by referring to FIG. 46. FIG. 46 is a diagram showing an important part of this embodiment. More particularly, FIG. 46 shows the general construction of a projection type liquid crystal display unit employing the VA type LCD device, that is, the liquid crystal panel projection type display unit (projector). In FIG. 46, those parts which are the same as those corresponding parts in FIG. 45 are designated by the same reference numerals, and a description thereof will be omitted.

In FIG. 46, a liquid crystal panel 83A has a construction according to any one of the first through twenty-third embodiments described above, and a negative refractive index anisotropy plate 91 with negative refractive index anisotropy is additionally provided. The Δnd of the negative refractive index anisotropy plate 91 is set identical to the Δnd of the liquid crystal panel 83A.

According to the experiments conducted by the present inventors, when the angle of the light from the light source 81 is converged by the condenser lens 82 and the light is irradiated on the liquid crystal panel 83A in front, it was confirmed that the light becomes incident to the liquid crystal panel 83A at a maximum incident angle of 10 degrees. Hence, in this embodiment, the tilt angle is set to 10 degrees, so that the incident angle of the light with respect to the liquid crystal panel 83A is in a range of plus 0 degrees and minus 20 degrees. The tilt angle refers to an angle which is tilted with respect to the optical axis. As a result, the incident angle of the light with respect to the liquid crystal panel 83A is set to a low value of 10 degrees or less, and the direction in which the liquid crystal molecules 30 incline becomes approximately perpendicular to the incident light. Consequently, the uniformity and contrast of the displayed picture were further improved when compared to the twenty-fourth embodiment described above.

Figure 47:
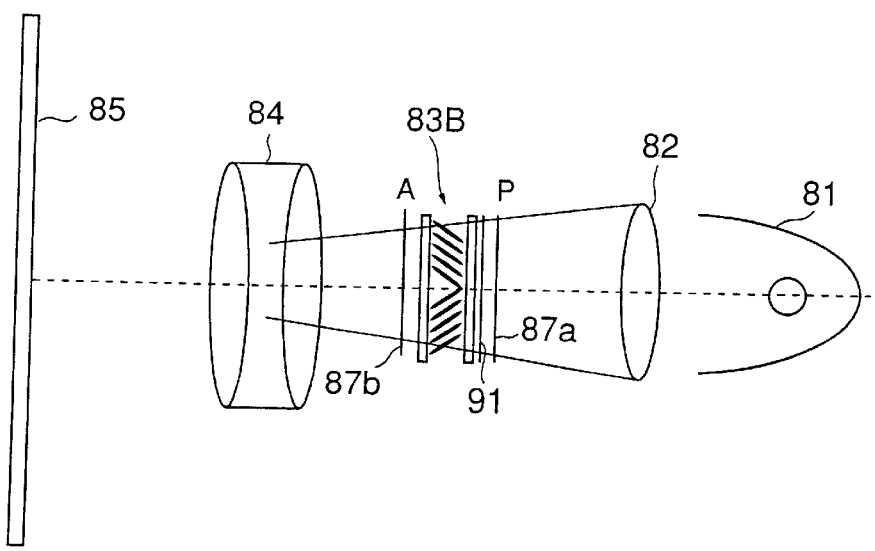
FIG. 47 is a plan view showing an important part of a twenty-sixth embodiment of the liquid crystal display device according to the present invention.

Next, a description will be given of a twenty-sixth embodiment of the liquid crystal display device according to the present invention, by referring to FIG. 47. FIG. 47 is a diagram showing an important part of this embodiment. More particularly, FIG. 47 shows the general construction of a projection type liquid crystal display unit employing the VA type LCD device, that is, the liquid crystal panel projection type display unit (projector). In FIG. 47, those parts which are the same as those corresponding parts in FIG. 45 are designated by the same reference numerals, and a description thereof will be omitted.

In FIG. 47, a liquid crystal panel 83B has a construction according to any of the first through twenty-third embodiments described above. In addition, the alignment is set so that the liquid crystal molecules 30 incline in mutually opposite directions between the upper half and the lower half of the liquid crystal panel 83B. As a result, even if the tilt angle is 0 degrees, the incident angle of the light with respect to the liquid crystal panel 83B is set to a low value of 10 degrees or less, and the direction in which the liquid crystal molecules 30 incline becomes approximately perpendicular to the incident light even when the tilt angle is 0 degrees. Therefore, the uniformity and contrast of the displayed picture were further improved when compared to the twenty-fourth embodiment described above.

Of course, it is possible to combine arbitrary ones of the embodiments described above depending on the desired characteristics of the liquid crystal display device.

Further, the present invention is not limited to these embodiments, but various variations and modifications may be made without departing from the scope of the present invention.

What is claimed is:

1. A homeotropic alignment type liquid crystal display device comprising:
   first and second substrates confronting each other;
   first and second bus lines arranged in mutually perpendicular directions on the second substrate;
   liquid crystals provided between the first and second substrates; and
   first, second and third projecting structures respectively made of an insulator and restricting alignment of the liquid crystals,
   said first projecting structures having a sloping surface which is inclined with respect to the first substrate and being provided on the first substrate in parallel with the first bus lines,
   said second projecting structures having a sloping surface which is inclined with respect to the second substrate and being provided on the second substrate in parallel with the first bus lines,
   said third projecting structures having a sloping surface which is inclined with respect to at least one of the first and second substrates, and being provided on at least one of the first and second substrates with an arrangement different from the first and second projecting structures.

2. The liquid crystal display device as claimed in claim 1, wherein said third projecting structures are provided in non-pixel regions of at least one of the first and second substrates.

3. The liquid crystal display device as claimed in claim 2, wherein said third projecting structures are alternately provided on the first and second substrates along the second bus lines.

4. The liquid crystal display device as claimed in claim 2, wherein said third projecting structures are provided on at least one of the first and second substrates along the second bus lines.

5. The liquid crystal display device as claimed in claim 1, wherein one of said first projecting structures and said second projecting structures are arranged to pass central parts of pixel regions which are defined by the first and second bus lines.

6. The liquid crystal display device as claimed in claim 1, wherein at least one of a width and a height of said third projecting structures is different from those of said first and second projecting structures.

7. The liquid crystal display device as claimed in claim 1, which further comprises:
   a blocking layer provided in non-pixel regions and blocking an electrical field from the first and second bus lines.

8. The liquid crystal display device as claimed in claim 1, which further comprises:
   a layer having a negative refractive index anisotropy.

9. A homeotropic alignment type liquid crystal display device comprising:
   first and second substrates confronting each other;
   first and second bus lines arranged in mutually perpendicular directions on the second substrate;
   liquid crystals provided between the first and second substrates; and
   projecting structures respectively made of an insulator and restricting alignment of the liquid crystals,
   said projecting structures having a sloping surface which is inclined with respect to at least one of the first and second substrates, and being provided in parallel with the first bus lines on at least on of the first and second substrates,
   at least one of the first and second substrates being subjected to a process which restricts alignment of the liquid crystals in a direction identical to a direction in which the alignment of the liquid crystals is restricted by said projecting structures.

10. The liquid crystal display device as claimed in claim 9, wherein said process is carried out by an optical alignment process.

11. The liquid crystal display device as claimed in claim 9, wherein said projecting structures include first projecting structures provided on the first substrate, and second projecting structures provided on the second substrate at positions deviated from positions of the first projecting structures.

12. The liquid crystal display device as claimed in claim 9, which further comprises:
   a subsidiary capacitance electrode provided on one of the first and second substrates at a position which divides each pixel region which is defined by the first and second bus lines into a first part and a second part, said liquid crystals being optically aligned in mutually opposite directions between the first and second parts.

13. A homeotropic alignment type liquid crystal display device comprising:
   a first substrate provided with a first transparent electrode;
   a second substrate provided with a second transparent electrode and confronting the first substrate;
   first and second bus lines arranged in mutually perpendicular directions on the second substrate;
   liquid crystals provided between the first and second transparent electrodes; and
   projecting structures respectively made of an insulator and restricting alignment of the liquid crystals,
   said projecting structures having a sloping surface which is inclined with respect to the first and second structures, and being provided in parallel with the first bus lines on at least one of the first and second transparent electrodes,
   one of the first and second transparent electrodes having slits.

14. The liquid crystal display device as claimed in claim 13, wherein said slits extend in a direction perpendicular to a direction in which the projecting structure extends.

15. The liquid crystal display device as claimed in claim 13, wherein said slits are provided approximately in entire pixel regions which are defined by the first and second bus lines.

16. The liquid crystal display device as claimed in claim 13, wherein said slits are at least provided only in vicinities of the second bus lines of pixel regions which are defined by the first and second bus lines.

17. A homeotropic alignment type liquid crystal display device comprising:
   a first substrate provided with a first transparent electrode;
   a second substrate provided with a second transparent electrode and confronting the first substrate;
   first bus lines and second bus lines arranged in mutually perpendicular directions on the second substrate; and
   liquid crystals provided between the first and second transparent electrodes,
   at least one of the first and second substrates being subjected to an optical alignment which restricts alignment of the liquid crystals, at least one of the first and second transparent electrodes having slits.

18. The liquid crystal display device as claimed in claim 17, wherein said slits extend in a direction oblique with respect to the first bus lines.

19. A homeotropic alignment type liquid crystal display device comprising:

a first substrate and a second substrate confronting each other;

first bus lines and second bus lines arranged in mutually perpendicular directions on the second substrate and defining pixel regions;

liquid crystals provided between the first and second substrates; and first projecting structures and second projecting structures respectively made of an insulator and restricting alignment of the liquid crystals, said first projecting structures having a sloping surface which is inclined with respect to the first substrate, and being provided on the first substrate in parallel with the first bus lines so as to overlap the first bus lines, said second projecting structures having a sloping surface which is inclined with respect to the second substrate, and being provided on the second substrate in parallel with the first bus lines so as to pass approximate centers of the pixel regions, said first projecting structures having a width which is greater than a width of the second projecting structures, and partially overlaps the pixel regions.

20. The liquid crystal display device as claimed in claim 19, which further comprises:

a light source irradiating a light on the liquid crystals with a 0 degree tilt angle.

21. The liquid crystal display device as claimed in claim 1, which further comprises:

a light source irradiating a light on the liquid crystals with a tilt angle via plates with negative refractive index anisotropy.

22. The liquid crystal display device as claimed in claim 9, which further comprises:

a light source irradiating a light on the liquid crystals with a tilt angle via plates with negative refractive index anisotropy.

23. The liquid crystal display device as claimed in claim 13, which further comprises:

a light source irradiating a light on the liquid crystals with a tilt angle via plates with negative refractive index anisotropy.

24. The liquid crystal display device as claimed in claim 17, which further comprises:

a light source irradiating a light on the liquid crystals with a tilt angle via plates with negative refractive index anisotropy.

25. The liquid crystal display device as claimed in claim 19, which further comprises:

a light source irradiating a light on the liquid crystals with a tilt angle via plates with negative refractive index anisotropy.

26. A homeotropic alignment type liquid crystal display device comprising:

a substrate;

first bus lines and second bus lines arranged in mutually perpendicular directions on the substrate and defining pixel regions;

a transistor provided on the substrate at a corner portion of a corresponding one of the pixel regions;

a contact electrode provided on the substrate and connecting to the transistor;

a planarization layer provided on the substrate so as to cover the first and second bus lines, the transistor and the contact electrode;

a groove provided in the planarization layer and extending diagonally within the pixel region and passing over portion of transistor in said corner portion; and a transparent electrode provided on the planarization layer and connecting to the contact electrode via the groove.

* * * * *

UNITED STATES PATENT AND TRADEMARK OFFICE
CERTIFICATE OF CORRECTION

PATENT NO.    : 6,501,524 B1                                   Page 1 of 1
DATED         : December 31, 2002
INVENTOR(S)   : Yoshida et al.

It is certified that error appears in the above-identified patent and that said Letters Patent is hereby corrected as shown below:

<u>Title page,</u>
Item [56], FOREIGN PATENT DOCUMENTS, delete "EP" and insert -- JP --.
Item [57], ABSTRACT,
Lines 4 and 15, delete "substrate" and insert -- substrates --.

<u>Column 20,</u>
Line 2, delete "on" and insert -- one -- therefore.

Signed and Sealed this

Tenth Day of June, 2003

JAMES E. ROGAN
*Director of the United States Patent and Trademark Office*